(12) United States Patent
Ginde

(10) Patent No.: US 8,832,298 B2
(45) Date of Patent: Sep. 9, 2014

(54) MANAGING EARLY MEDIA FOR COMMUNICATION SESSIONS ESTABLISHED VIA THE SESSION INITIATION PROTOCOL (SIP)

(75) Inventor: Samir V. Ginde, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 116 days.

(21) Appl. No.: 13/422,211

(22) Filed: Mar. 16, 2012

(65) Prior Publication Data

US 2013/0246632 A1    Sep. 19, 2013

(51) Int. Cl.
*G06F 15/16* (2006.01)
*G06F 12/00* (2006.01)

(52) U.S. Cl.
USPC .......................................... 709/231; 709/227

(58) Field of Classification Search
USPC ........................ 790/223–229, 231–233, 250
See application file for complete search history.

(56) References Cited

U.S. PATENT DOCUMENTS

| | | | |
|---|---|---|---|
| 7,464,167 B2 | 12/2008 | Levent-Levi et al. | |
| 7,886,060 B2 | 2/2011 | Rosenberg | |
| 2007/0058537 A1 | 3/2007 | Belling | |
| 2008/0259909 A1 | 10/2008 | Runeson et al. | |
| 2009/0049190 A1* | 2/2009 | Jiang et al. | 709/238 |
| 2009/0286516 A1* | 11/2009 | Sedlacek et al. | 455/414.1 |
| 2010/0004014 A1* | 1/2010 | Coulombe | 455/519 |
| 2010/0165976 A1 | 7/2010 | Khan et al. | |
| 2011/0047282 A1* | 2/2011 | Denman et al. | 709/231 |
| 2011/0116492 A1* | 5/2011 | Byron et al. | 370/352 |
| 2012/0005362 A1* | 1/2012 | Hayashi et al. | 709/231 |

OTHER PUBLICATIONS

International Search Report and Written Opinion—PCT/US2013/029990—ISA/EPO—Jul. 8, 2013.
Stucker B., et al., "Coping with Early Media in the Session Initiation Protocol (SIP); draft-stucker-sipping-early-media-coping-0 3", No. 3, Oct. 18, 2006, XP015048561, ISSN: 0000-0004.

* cited by examiner

*Primary Examiner* — Zarni Maung
(74) *Attorney, Agent, or Firm* — Raphael Freiwirth

(57) ABSTRACT

A communications device sends an invite to a communication session to multiple target devices and receives first and second media streams from first and second target devices prior to receiving a signaling indication that any of the multiple target devices accepts the invite. The communications device selects between the first and second media streams based upon (i) information contained in a first packet of the first or second media streams and/or (ii) signaling information that indicates a forking context for the communication session. The communication device plays the selected media stream prior to receipt of the signaling indication. In another embodiment, after sending the invite, the communications device detects a network address and port information from (i) a media stream from a target device, and (ii) from a signaling message. The communication device sends media to the target device based on the detected information.

18 Claims, 19 Drawing Sheets

EARLY MEDIA HANDLING FOR A
FORKED SESSION

CALL FORWARDING

*CRBT*

FLEXIBLE ALERTING

CRBT + CF

DYNAMIC OPTION #1 – CODEC SWITCHING
WITH FIRST SOURCE PREFERRED

DYNAMIC OPTION #2 – CODEC SWITCHING
WITH LATEST SOURCE PREFERRED

OUTBOUND EARLY MEDIA

CONTEXT SPECIFIC EARLY MEDIA EVENTS AND ACTIONS
[CALL FORWARD]

CONTEXT SPECIFIC EARLY MEDIA EVENTS AND ACTIONS
[CRBT]

CONTEXT SPECIFIC EARLY MEDIA EVENTS AND ACTIONS
[MEDIA SOURCE IDENTIFIED FOR DYNAMIC OPTION 2]

CONFIRMED DIALOG MEDIA HANDLING
OPTION A

CONFIRMED DIALOG MEDIA HANDLING
OPTION B

MANAGING EARLY MEDIA FOR COMMUNICATION SESSIONS ESTABLISHED VIA THE SESSION INITIATION PROTOCOL (SIP)

BACKGROUND OF THE INVENTION

1. Field of the Invention

Embodiments relate managing early media for communication sessions established via the session initiation protocol (SIP).

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data, Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (W-CDMA), CDMA2000 (such as CDMA2000 1xEV-DO standards, for example) or TD-SCDMA.

The Session Initiation Protocol (SIP) is a signaling protocol that can be used for call control, for example, of telephone conversations. To describe the switched communication connection, SIP uses the Session Description Protocol (SDP). When an SIP INVITE message is transmitted by an originating UE, a forking event may occur where a plurality of target terminals send provisional responses back to the originating UE, resulting in a plurality of "early" dialogs being instantiated before any of the dialogs are actually confirmed (e.g., based on a target user answering or accepting the call). In this case, it can be difficult for the originating UE to figure out how to handle the early dialogs.

SUMMARY

In an embodiment, a communications device sends an invite to a communication session to multiple target devices and receives first and second media streams from first and second target devices prior to receiving a signaling indication that any of the multiple target devices accepts the invite. The communications device selects between the first and second media streams based upon (i) information contained in a first packet of the first or second media streams and/or (ii) signaling information that indicates a forking context for the communication session. The communication device plays the selected media stream prior to receipt of the signaling indication. In another embodiment, after sending the invite, the communications device detects a network address and port information from (i) a media stream from a target device, and (ii) from a signaling message. The communication device sends media to the target device based on the detected information.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
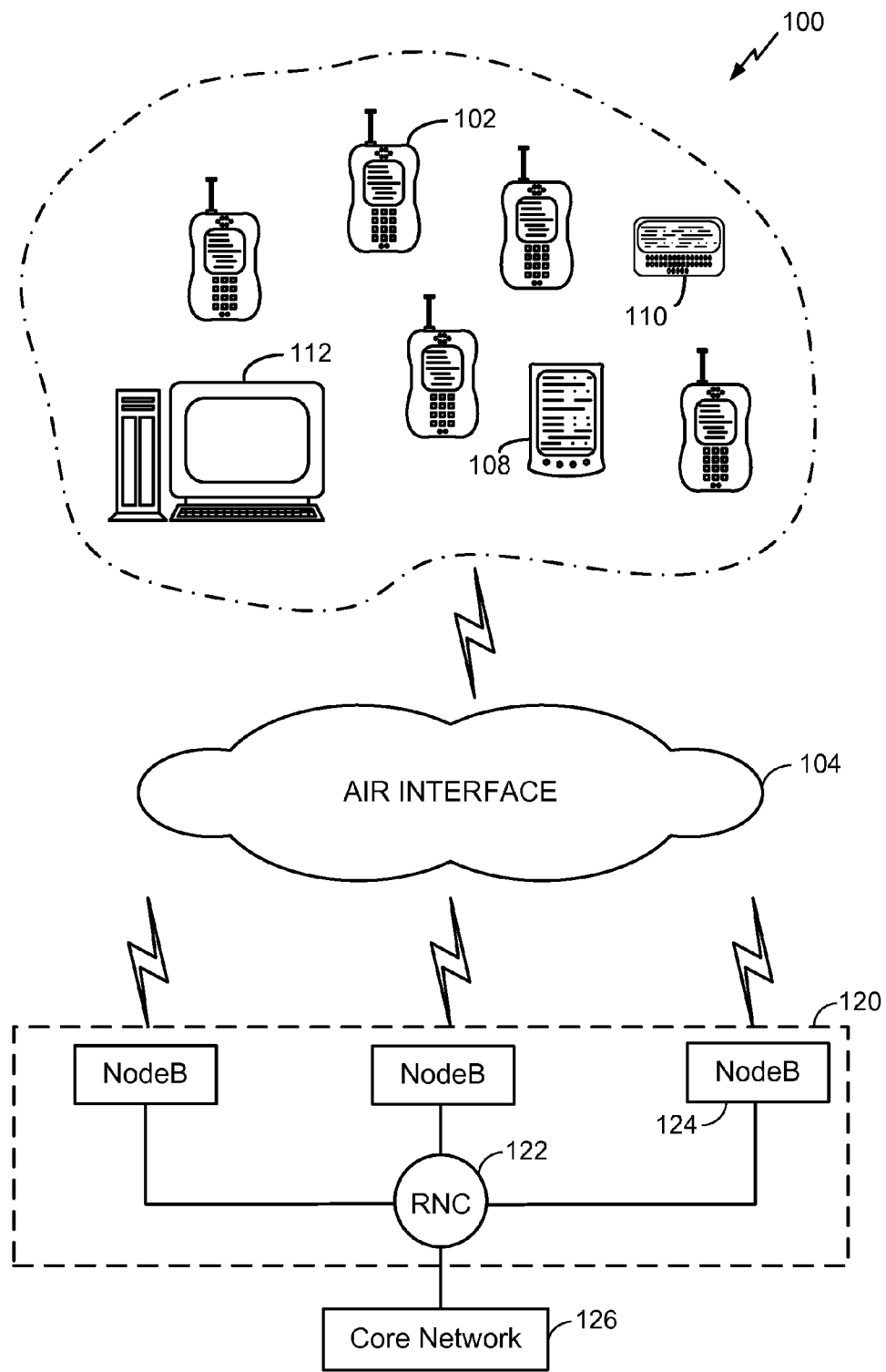
FIG. 1 is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as user equipment (UE), may be mobile or stationary, and may communicate with one or more access points (APs), which may be referred to as Node Bs. A UE transmits and receives data packets through one or more of the Node Bs to a Radio Network Controller (RNC). The Node Bs and RNC are parts of a network called a radio access network (RAN). A radio access network can transport voice and data packets between multiple access terminals.

The radio access network may be further connected to additional networks outside the radio access network, such core network including specific carrier related servers and devices and connectivity to other networks such as a corporate intranet, the Internet, public switched telephone network (PSTN), a Serving General Packet Radio Services (GPRS) Support Node (SGSN), a Gateway GPRS Support Node (GGSN), and may transport voice and data packets between each UE and such networks. A UE that has established an active traffic channel connection with one or more Node Bs may be referred to as an active UE, and can be referred to as being in a traffic state. A UE that is in the process of establishing an active traffic channel (TCH) connection with one or more Node Bs can be referred to as being in a connection setup state. A UE may be any data device that communicates through a wireless channel or through a wired channel. A UE may further be any of a number of types of devices including but not limited to PC card, compact flash device, external or internal modem, or wireless or wireline phone. The communication link through which the UE sends signals to the Node B(s) is called an uplink channel (e.g., a reverse traffic channel, a control channel, an access channel, etc.). The communication link through which Node B(s) send signals to a UE is called a downlink channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a block diagram of one exemplary embodiment of a wireless communications system 100 in accordance with at least one embodiment of the invention. System 100 can contain UEs, such as cellular telephone 102, in communication across an air interface 104 with an access network or radio access network (RAN) 120 that can connect the UE 102 to network equipment providing data connectivity between a packet switched data network (e.g., an intranet, the Internet, and/or core network 126) and the UEs 102, 108, 110, 112. As shown here, the UE can be a cellular telephone 102, a personal digital assistant or tablet computer 108, a pager or laptop 110, which is shown here as a two-way text pager, or even a separate computer platform 112 that has a wireless communication portal. Embodiments of the invention can thus be realized on any form of UE including a wireless communication portal or having wireless communication capabilities, including without limitation, wireless modems, PCMCIA cards, personal computers, telephones, or any combination or sub-combination thereof. Further, as used herein, the term "UE" in other communication protocols (i.e., other than W-CDMA) may be referred to interchangeably as an "access terminal," "AT," "wireless device," "client device," "mobile terminal," "mobile station" and variations thereof.

Referring back to FIG. 1, the components of the wireless communications system 100 and interrelation of the elements of the exemplary embodiments of the invention are not limited to the configuration illustrated. System 100 is merely exemplary and can include any system that allows remote UEs, such as wireless client computing devices 102, 108, 110, 112 to communicate over-the-air between and among each other and/or between and among components connected via the air interface 104 and RAN 120, including, without limitation, core network 126, the Internet, PSTN, SGSN, GGSN and/or other remote servers.

The RAN 120 controls messages (typically sent as data packets) sent to a RNC 122. The RNC 122 is responsible for signaling, establishing, and tearing down bearer channels (i.e., data channels) between a Serving General Packet Radio Services (GPRS) Support Node (SGSN) and the UEs 102/108/110/112. If link layer encryption is enabled, the RNC 122 also encrypts the content before forwarding it over the air interface 104. The function of the RNC 122 is well-known in the art and will not be discussed further for the sake of brevity. The core network 126 may communicate with the RNC 122 by a network, the Internet and/or a public switched telephone network (PSTN). Alternatively, the RNC 122 may connect directly to the Internet or external network. Typically, the network or Internet connection between the core network 126 and the RNC 122 transfers data, and the PSTN transfers voice information. The RNC 122 can be connected to multiple Node Bs 124. In a similar manner to the core network 126, the RNC 122 is typically connected to the Node Bs 124 by a network, the Internet and/or PSTN for data transfer and/or voice information. The Node Bs 124 can broadcast data messages wirelessly to the UEs, such as cellular telephone 102. The Node Bs 124, RNC 122 and other components may form the RAN 120, as is known in the art. However, alternate configurations may also be used and the invention is not limited to the configuration illustrated. For example, in another embodiment the functionality of the RNC 122 and one or more of the Node Bs 124 may be collapsed into a single "hybrid" module having the functionality of both the RNC 122 and the Node B(s) 124.

Figure 2:
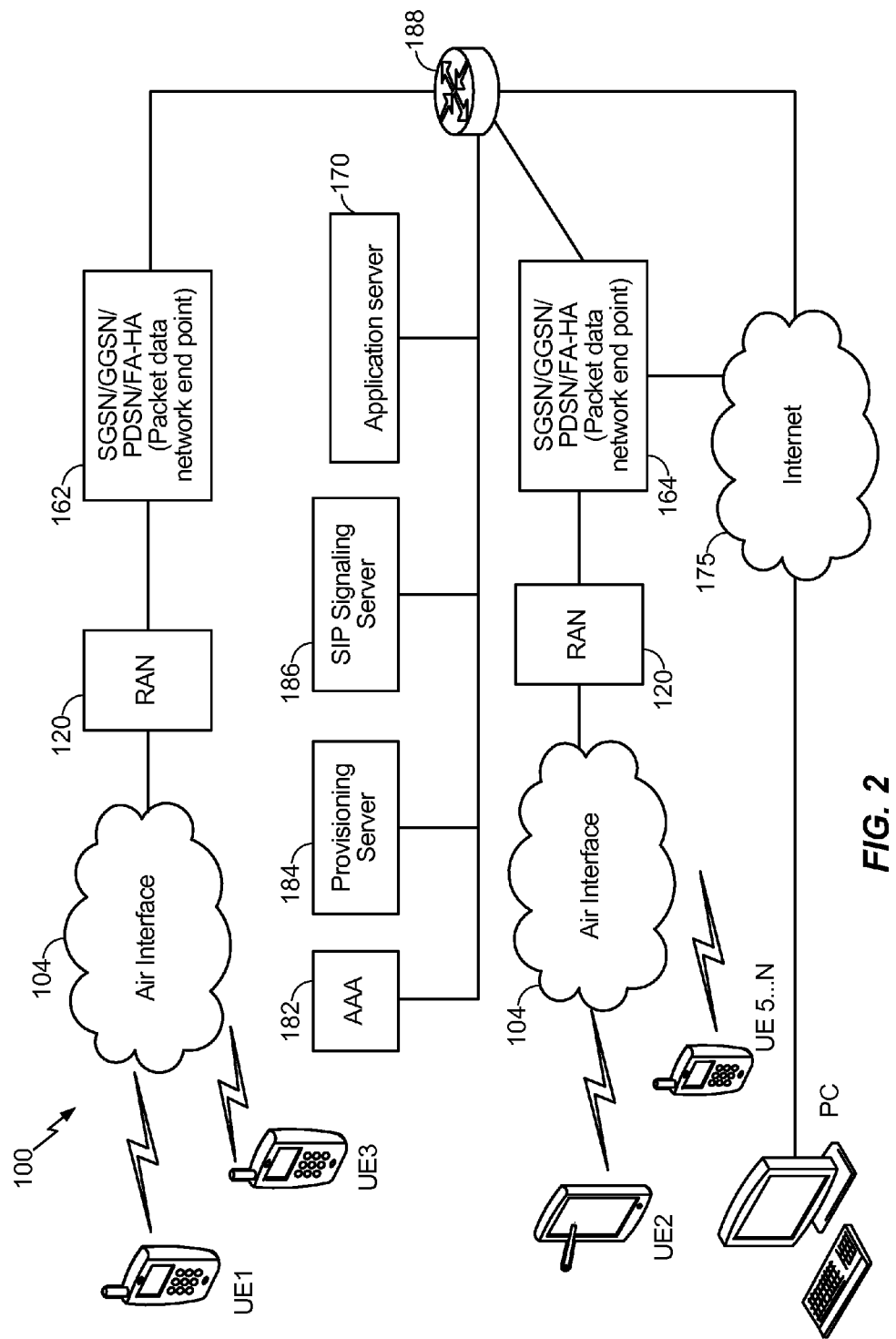
FIG. 2 illustrates a core network according to an embodiment of the present invention.

FIG. 2 illustrates an example of the wireless communications system 100 of FIG. 1 in more detail. In particular, referring to FIG. 2, UEs 1 . . . N are shown as connecting to the RAN 120 at locations serviced by different packet data network end-points. The illustration of FIG. 2 is specific to W-CDMA systems and terminology, although it will be appreciated how FIG. 2 could be modified to conform with various other wireless communications protocols (e.g., LTE, EV-DO, UMTS, etc.) and the various embodiments are not limited to the illustrated system or elements.

UEs 1 and 3 connect to the RAN 120 at a portion served by a first packet data network end-point 162 (e.g., which may correspond to SGSN, GGSN, PDSN, a home agent (HA), a foreign agent (FA), PGW/SGW in LTE, etc.). The first packet data network end-point 162 in turn connects, via the routing unit 188, to the Internet 175 and/or to one or more of an authentication, authorization and accounting (AAA) server 182, a provisioning server 184, a Session Initiation Protocol (SIP) signaling server 186 and/or the application server 170. UEs 2 and 5 . . . N connect to the RAN 120 at a portion served by a second packet data network end-point 164 (e.g., which may correspond to SGSN, GGSN, PDSN, FA, HA, etc.). The SIP Signaling Server 186 is configured to exchange SIP signaling messages between IP media terminals (e.g., VoIP terminals), whereby media between the IP media terminals is exchanged in a more direct manner (e.g., peer to peer, without direct mediation by a particular server). Similar to the first packet data network end-point 162, the second packet data network end-point 164 in turn connects, via the routing unit 188, to the Internet 175 and/or to one or more of the AAA server 182, a provisioning server 184, the SIP signaling server 186 and/or the application server 170. UE 4 connects directly to the Internet 175, and through the Internet 175 can then connect to any of the system components described above. In an example, the SIP signaling server 186 can also be part of a control subsystem such as an IP Multimedia Subsystem (IMS). Thus, the network architecture arrangement shown in FIG. 2 is not the only environment where the SIP signaling server 186 may operate.

Referring to FIG. 2, UEs 1, 3 and 4 . . . N are illustrated as wireless cell-phones, UE 2 is illustrated as a wireless tablet— and/or laptop PC. However, in other embodiments, it will be appreciated that the wireless communication system 100 may connect to any type of UE, and the examples illustrated in FIG. 2 are not intended to limit the types of UEs that may be implemented within the system.

Figure 3:
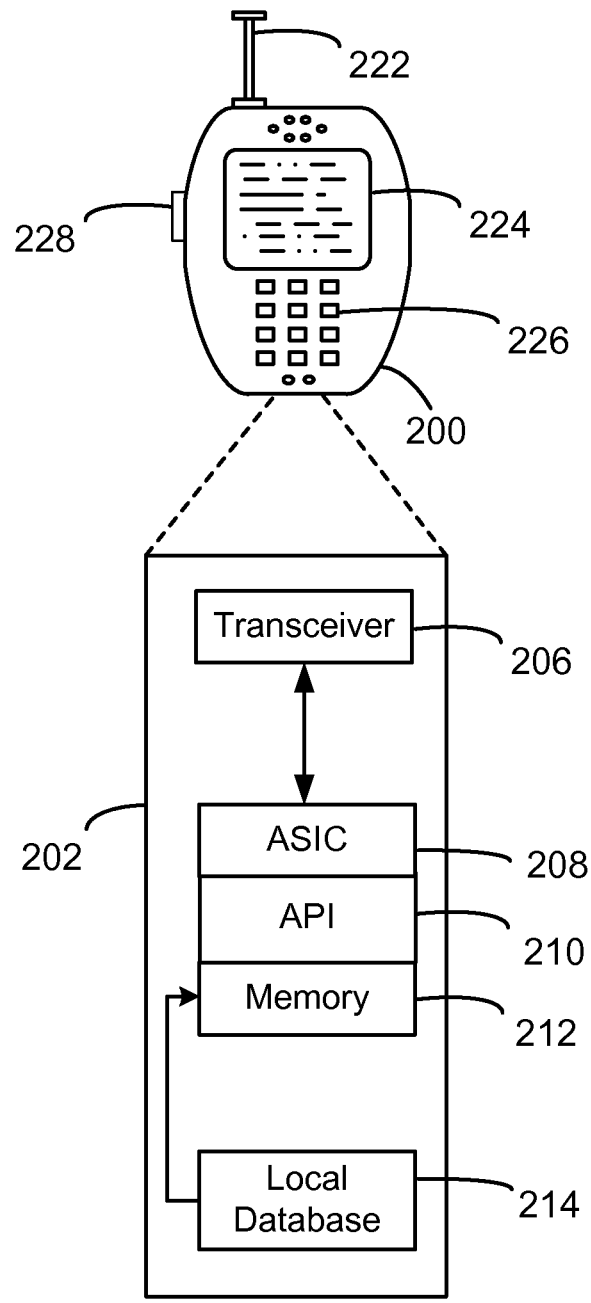
FIG. 3 is an illustration of a user equipment (UE) in accordance with at least one embodiment of the invention.

Referring to FIG. 3, a UE 200, (here a wireless device), such as a cellular telephone, has a platform 202 that can receive and execute software applications, data and/or commands transmitted from the RAN 120 that may ultimately come from the core network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include a UE including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the UE 200 in FIG. 3 are to be considered merely illustrative and the invention is not limited to the illustrated features or arrangement.

The wireless communication between the UE 102 or 200 and the RAN 120 can be based on different technologies, such as code division multiple access (CDMA), W-CDMA, time division multiple access (TDMA), frequency division multiple access (FDMA), Orthogonal Frequency Division Multiplexing (OFDM), the Global System for Mobile Communications (GSM), 3GPP Long Term Evolution (LTE) or other protocols that may be used in a wireless communications network or a data communications network. Accordingly, the illustrations provided herein are not intended to limit the embodiments of the invention and are merely to aid in the description of aspects of embodiments of the invention.

Figure 4:
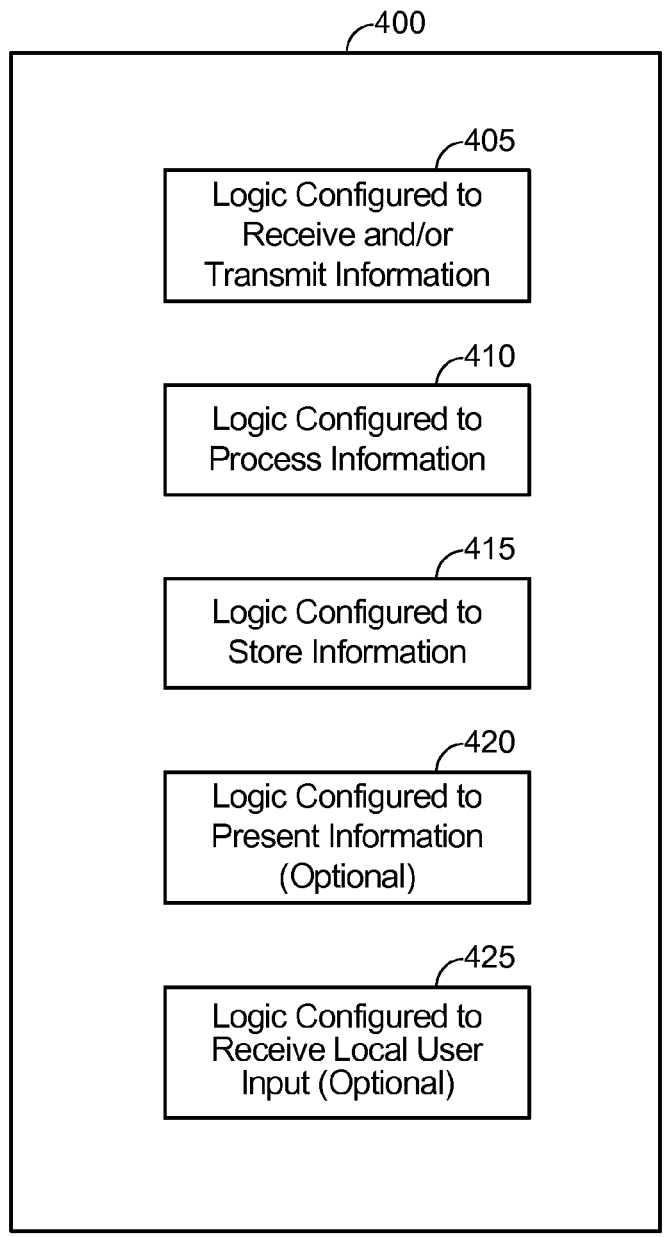
FIG. 4 illustrates a communication device that includes logic configured to perform functionality.

FIG. 4 illustrates a communication device 400 that includes logic configured to perform functionality. The communication device 400 can correspond to any of the above-noted communication devices, including but not limited to UEs 102, 108, 110, 112 or 200, Node Bs or base stations 120, the RNC or base station controller 122, a packet data network end-point (e.g., SGSN 160, GGSN 165, a Mobility Management Entity (MME) in Long Term Evolution (LTE), etc.), any of the servers 170 through 186, etc. Thus, communication device 400 can correspond to any electronic device that is configured to communicate with (or facilitate communication with) one or more other entities over a network.

Referring to FIG. 4, the communication device 400 includes logic configured to receive and/or transmit information 405. In an example, if the communication device 400 corresponds to a wireless communications device (e.g., UE 200, Node B 124, etc.), the logic configured to receive and/or transmit information 405 can include a wireless communications interface (e.g., Bluetooth, WiFi, 2G, 3G, etc.) such as a wireless transceiver and associated hardware (e.g., an RF antenna, a MODEM, a modulator and/or demodulator, etc.). In another example, the logic configured to receive and/or transmit information 405 can correspond to a wired communications interface (e.g., a serial connection, a USB or Firewire connection, an Ethernet connection through which the Internet 175 can be accessed, etc.). Thus, if the communication device 400 corresponds to some type of network-based server (e.g., SGSN 160, GGSN 165, application server 170, etc.), the logic configured to receive and/or transmit information 405 can correspond to an Ethernet card, in an example, that connects the network-based server to other communication entities via an Ethernet protocol. In a further example, the logic configured to receive and/or transmit information 405 can include sensory or measurement hardware by which the communication device 400 can monitor its local environment (e.g., an accelerometer, a temperature sensor, a light sensor, an antenna for monitoring local RF signals, etc.). The logic configured to receive and/or transmit information 405 can also include software that, when executed, permits the associated hardware of the logic configured to receive and/or transmit information 405 to perform its reception and/or transmission function(s). However, the logic configured to receive and/or transmit information 405 does not correspond to software alone, and the logic configured to receive and/or transmit information 405 relies at least in part upon hardware to achieve its functionality.

Referring to FIG. 4, the communication device 400 further includes logic configured to process information 410. In an example, the logic configured to process information 410 can include at least a processor. Example implementations of the type of processing that can be performed by the logic configured to process information 410 includes but is not limited to performing determinations, establishing connections, making selections between different information options, performing evaluations related to data, interacting with sensors coupled to the communication device 400 to perform measurement operations, converting information from one format to another (e.g., between different protocols such as .wmv to .avi, etc.), and so on. For example, the processor included in the logic configured to process information 410 can correspond to a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 410 can also include software that, when executed, permits the associated hardware of the logic configured to process information 410 to perform its processing function(s). However, the logic configured to process information 410 does not correspond to software alone, and the logic configured to process information 410 relies at least in part upon hardware to achieve its functionality.

Referring to FIG. 4, the communication device 400 further includes logic configured to store information 415. In an example, the logic configured to store information 415 can include at least a non-transitory memory and associated hardware (e.g., a memory controller, etc.). For example, the non-transitory memory included in the logic configured to store information 415 can correspond to RAM memory, flash memory, ROM memory, EPROM memory, EEPROM memory, registers, hard disk, a removable disk, a CD-ROM, or any other form of storage medium known in the art. The logic configured to store information 415 can also include software that, when executed, permits the associated hardware of the logic configured to store information 415 to perform its storage function(s). However, the logic configured to store information 415 does not correspond to software alone, and the logic configured to store information 415 relies at least in part upon hardware to achieve its functionality.

Referring to FIG. 4, the communication device 400 further optionally includes logic configured to present information 420. In an example, the logic configured to present information 420 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 400. For example, if the communication device 400 corresponds to UE 200 as shown in FIG. 3, the logic configured to present information 420 can include the display 224. In a further example, the logic configured to present information 420 can be omitted for certain communication devices, such as network communication devices that do not have a local user (e.g., network switches or routers, remote servers, etc.). The logic configured to present information 420 can also include software that, when executed, permits the associated hardware of the logic configured to present information 420 to perform its presentation function(s). However, the logic configured to present information 420 does not correspond to software alone, and the logic configured to present information 420 relies at least in part upon hardware to achieve its functionality.

Referring to FIG. 4, the communication device 400 further optionally includes logic configured to receive local user input 425. In an example, the logic configured to receive local user input 425 can include at least a user input device and associated hardware. For example, the user input device can include buttons, a touch-screen display, a keyboard, a camera, an audio input device (e.g., a microphone or a port that can carry audio information such as a microphone jack, etc.), and/or any other device by which information can be received from a user or operator of the communication device 400. For example, if the communication device 400 corresponds to UE 200 as shown in FIG. 3, the logic configured to receive local user input 425 can include the display 224 (if implemented a touch-screen), keypad 226, etc. In a further example, the logic configured to receive local user input 425 can be omitted for certain communication devices, such as network communication devices that do not have a local user (e.g., network switches or routers, remote servers, etc.). The logic configured to receive local user input 425 can also include software that, when executed, permits the associated hardware of the logic configured to receive local user input 425 to perform its input reception function(s). However, the logic configured to receive local user input 425 does not correspond to software alone, and the logic configured to receive local user input 425 relies at least in part upon hardware to achieve its functionality.

Referring to FIG. 4, while the configured logics of 405 through 425 are shown as separate or distinct blocks in FIG. 4, it will be appreciated that the hardware and/or software by which the respective configured logic performs its functionality can overlap in part. For example, any software used to facilitate the functionality of the configured logics of 405 through 425 can be stored in the non-transitory memory associated with the logic configured to store information 415, such that the configured logics of 405 through 425 each performs their functionality (i.e., in this case, software execution) based in part upon the operation of software stored by the logic configured to store information 415. Likewise, hardware that is directly associated with one of the configured logics can be borrowed or used by other configured logics from time to time. For example, the processor of the logic configured to process information 410 can format data into an appropriate format before being transmitted by the logic configured to receive and/or transmit information 405, such that the logic configured to receive and/or transmit information 405 performs its functionality (i.e., in this case, transmission of data) based in part upon the operation of hardware (i.e., the processor) associated with the logic configured to process information 410.

It will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the embodiments described below in more detail.

The Session Initiation Protocol (SIP) is a signaling protocol that can be used for call control, for example, of telephone conversations. SIP is standardized by the IETF in RFC 3261 and in an older version in RFC 2543. To describe the switched communication connection, SIP uses the Session Description Protocol (SDP), IETF RFC 2327, in a manner described in IETF RFC 3264. SIP, together with the negotiated full user data connections (e.g. speech connections), can be transmitted using the Internet protocol. SIP is used in the above-described manner in, for example, the Internet Multimedia Subsystem (IMS) of a mobile radio communication network standardized by 3GPP or 3GPP2.

During initiation of a call from the SIP terminal of a first UE (e.g., caller A) to a second UE (e.g., a called party B), the SIP signaling can be redirected by switching nodes or "proxies", such as SIP signaling server 186. The proxies are permitted to redirect an incoming message which presents a request by the caller A for a connection to the called party B (e.g., an INVITE request) to a plurality of other proxies or SIP terminals simultaneously or sequentially—for example, in order to search for the called party B. Because the last-mentioned proxies can branch the message when redirecting it, a tree-like branching of the message can occur. This branched redirection of messages is referred to in SIP as "forking".

When the INVITE message reaches a terminal (or UE) of called party B, this terminal can respond with what is called a "1xx provisional response" which can serve, for example, to negotiate the media (e.g. speech, video) used for the communication connection and their coding, or to indicate that the user B is being alerted (for example, by the ringing of an SIP telephone). In the event of forking, a plurality of terminals send such provisional responses—for example, if a plurality of SIP telephones ring simultaneously. To conclude the initiation of the communication relationship between a terminal of caller A and a terminal of the called party B, the latter terminal responds with what is called a "2xx final response", for example, when called party B has taken the SIP telephone off the hook. A plurality of terminals of called party B can send such final responses, for example, if a plurality of ringing SIP telephones are taken off the hook (e.g., called party B has multiple phones in his/her house, and different people pick up different phones). Accordingly, it can happen that the terminal of caller A receives provisional responses and/or final responses from a plurality of terminals of called party B. Each terminal of called party B provides the messages it sends as responses to A with the same unique identification. If SIP response messages with a new identification reach the terminal of A, the terminal of A learns therefrom that it is communicating with a new terminal point. In this case the SIP refers to a "dialog" existing between the terminal of caller A and the responding terminal of called party B. Before caller A (and/or called party B, if applicable) receives a final response for at least one dialog, each dialog is referred to as an "early dialog". After the final response is received for an early dialog, that early dialog transitions to an "established dialog".

It can happen that before the end of initiation of the communication relationship, the terminals of caller A and called party B exchange media (user data) which is referred to as "early media". For example, as in a conventional telephone network, media packets may be transmitted, preferably in the direction from called party B to caller A. This can occur because the exchange of signaling messages for setting up the communication session are exchanged via an SIP server such as SIP signaling server 186 which performs a signaling function for the communication session, and the signaling connection via the SIP signaling server 186 generally experiences more latency than the connection used to exchange the media packets.

If a plurality of dialogs are established in (/with) terminal A during initiation of the communication relationship from caller A to called party B as a result of forking, caller A may also receive media (user data), in particular early media, from different terminals B, B'. The terminal of A will attempt to present the incoming media in a suitable fashion. For example, it is possible that different incoming video streams are displayed in separate windows on a display screen of terminal A. Frequently, however, it is appropriate to select only one incoming media stream for presentation and to block or suppress the remaining media streams—for example, because the display screen in a mobile terminal is typically too small to show a plurality of windows, or because the superposing of different ring tones or announcements would make the content unintelligible.

Conventionally, information on the corresponding SIP dialogs might be criteria permitting the selection of a suitable media stream (user data stream) for representation. For example, in one conventional approach to early media handling, if an early dialog becomes an established dialog through receipt of the first SIP final response, terminal A selects the corresponding media stream (after the establishment). Alternatively, in another conventional approach, it may be appropriate for terminal A to select the early media that corresponds to the early dialog last established. For example, selecting the early dialog last established may be appropriate if the proxies initiate forking in a sequential manner. If the called terminal B sends a negative response, or if after a given time the communication relationship with it has not been established, for example, because no user has gone "off-hook", the SIP proxy or signaling server 186 redirects the INVITE request to a different terminal. The IETF specifies methods which will permit terminal A to request a proxy to search only sequentially. Terminal A can release dialogs using SIP signaling—for example, because it is able to support only a limited number of dialogs. The corresponding media can, however, continue to be received for a certain time because of the delay times of signaling and media. If so, the incoming media at terminal A for a terminated dialog is suppressed.

The information contained in SIP and SDP does not always unambiguously allow an SIP dialog to be correlated with the corresponding media stream. In particular, the terminal of caller A selects an IP address and port, for example, a UDP port (see IETF RFC 768) to receive the media streams before it sends the INVITE request containing this information. All incoming media for the communication session is therefore received at the same IP address and the same port. The IP address and port of the source media can be distinguished by using the parameter "source IP address" in the IP header and "source port" in the UDP header of the packets received, i.e. the IP address and the port from which the packets were sent. However, according to RFC 3264, no information on this source IP address and source port is contained in SIP/SDP, but only on the destination IP address and the destination port, i.e. the IP address and port to which the packets were sent.

When SIP forking was designed, the interaction with early media was at first not considered, since early media occur in an SIP network only in special cases, for example, in conjunction with a conventional telephone network. More recently, the handling of early media (user data) in the case of forking includes establishing separate communication connections for early media user data to be negotiated using SIP, with terminal B acting as a caller in the communication connections for early media when it receives a call from caller A for the actual user connection and initially enters into an early dialog regarding this call for the user connection with A. However, this has the disadvantage that considerably more SIP messages must be exchanged, leading to delay in initiating the call and higher resource demand, especially when transmitting via an air interface with narrow bandwidth. In addition, it might possibly be necessary to reserve separate transmission resources for early media and for the actual user connection.

In another conventional approach to handling early media, a parameter which allows expression of the source IP address and the source UDP port from which a recipient wishes to receive packets can be used. This information can be useful in configuring interposed firewalls. However, this parameter is unsuitable for correlating SIP dialogs and media streams because it presupposes that the recipient already knows the source IP address and the source UDP port. Moreover, the use of this parameter in H.248 signaling has not so far been described.

Figure 5:
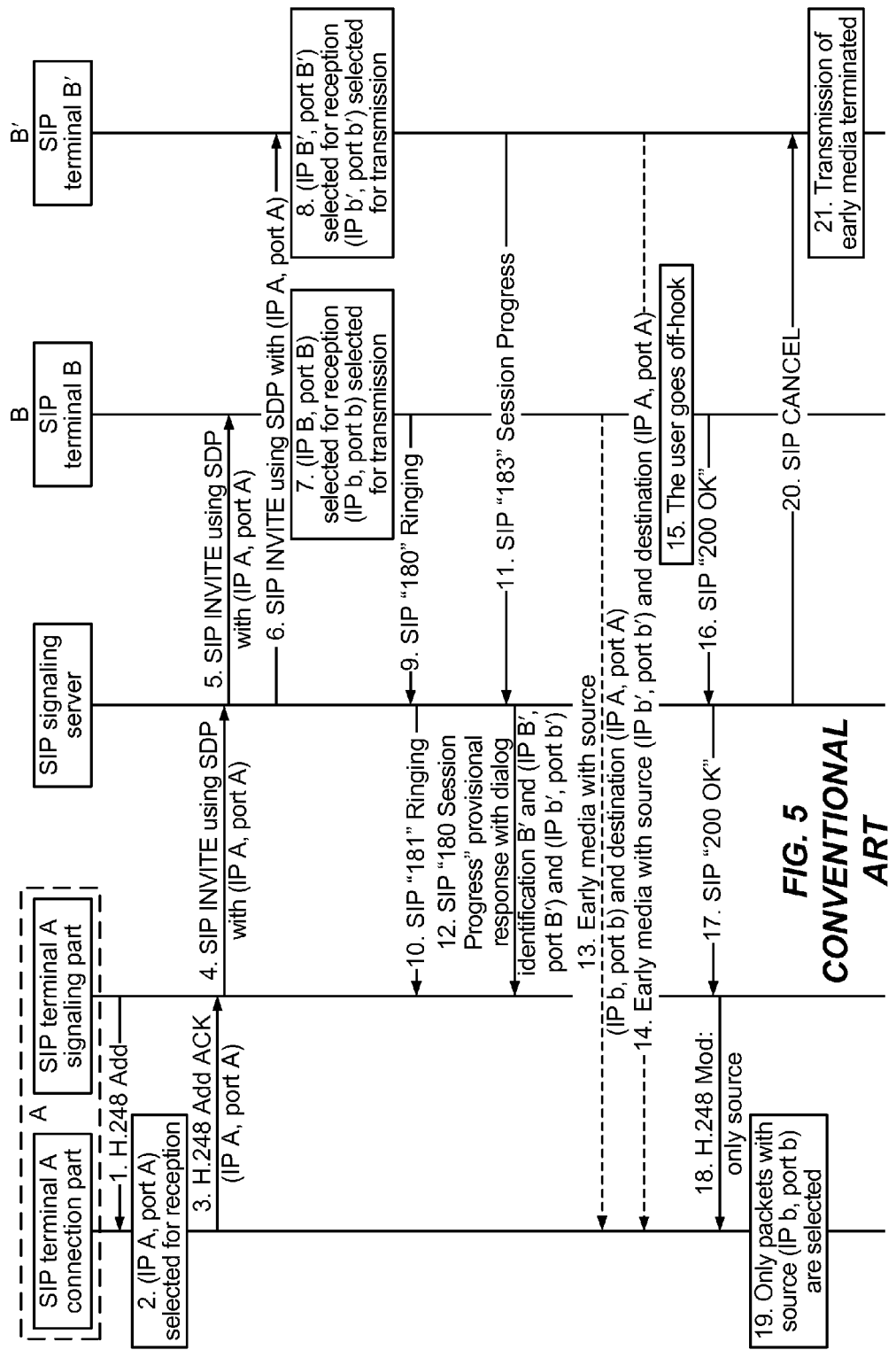
FIG. 5 illustrates a conventional set-up procedure for a communication session using the Session Initiation Protocol (SIP).

FIG. 5 illustrates a conventional set-up procedure for a communication session using the SIP. Referring to FIG. 5, a calling subscriber A operating an SIP terminal A (or UE) includes an SIP connection part and an SIP signaling part, which communicates via the RAN 120 with a called subscriber B operating an SIP terminal B and a called subscriber B' operating an SIP terminal B'. For example, the SIP terminals B and B' may be two UEs associated with the same called subscriber or UEs associated with different called subscribers. The SIP terminal A connection part may be, for example, an "IM-MGW" and the SIP terminal A signaling part may be an "MGCF", the SIP proxy may be an "S-CSCF" and the SIP terminals B and B' may be so-called "UE"s. For simplicity a number of SIP messages, for example, "100 Trying", PRACK and 200 OK (PRACK) have been omitted from FIG. 5.

Referring to FIG. 5, following a message in step 1 from the SIP terminal A signaling part to the SIP terminal A connection part, a communication set-up procedure is initiated. The SIP terminal A connection part selects the address to be used by the SIP terminal A for future reception (IP address of A (IP A)) and port number of A (port A)), step 2, and transfers the selected address in step 3 to the SIP A signaling part which, in step 4, sends an SIP INVITE message specifying the terminal A reception address (IP A, port A) to the SIP signaling server 186 (e.g., via the RAN 120) which applies SIP forking and, in steps 5 and 6, transmits this SIP INVITE message to the called subscriber B terminal (SIP terminal B) and the called subscriber B' terminal (SIP terminal B').

Then, in step 7, the SIP terminal B selects its called subscriber reception address (IP B, port B) and transmission address (IP b, port b). In step 8 SIP terminal B' selects its called subscriber reception address (IP B' and port B') for reception, and its called subscriber transmission address (IP b' and port b') for transmission.

In step 9 the called subscriber reception address (IP B, port B) selected in called subscriber B and, the called subscriber transmission address (IP b, port b) together with a unique identification of the dialog B, are transmitted in an SIP 180 Ringing provisional response message to the SIP signaling server 186, which transmits them to the calling subscriber (A) in step 10. In addition, in step 11, an SIP 183 Session Progress provisional response message with the further called subscriber reception address (IP B', port B') and, the called subscriber transmission address (IP b', port b') and the dialog identification B', are transmitted onwards by the further SIP terminal B' to the SIP signaling server 186 and, (in step 12) to SIP terminal A (the calling subscriber A).

To transmit the called subscriber transmission addresses (IP b, port b) and (IP b', port b') in messages 9 to 12, an SDP parameter may, for example, be used. Through the receipt of messages 9 and 11 with different dialog identifications B and B', the SIP terminal A connection part knows that it is signaling with two terminals B and B', and that at this time both terminals are possibly transmitting data (early media) to (IP A, port A), as in steps 13 and 14, from the called subscriber (SIP terminal B or B') to the terminal of the calling subscriber A. As this happens the SIP terminal B (or the further destination and SIP terminal B') specifies a called subscriber transmission address (IP b, port b or IP b', port b') indicating where the data originates, to enable the calling subscriber A to determine its origin. In addition, the early media data transmitted in step 13 and 14 also contains a destination address of the calling subscriber (A) which is used for IP routing. Early media data may contain, for example, ring tones, announcements, etc.

In FIG. 5, the early media received at steps 13 and 14 of FIG. 5 is received along with a called subscriber B transmission address (IP b, port b) and the called subscriber reception address (IP B, port B) (transmitted in a response) in a response message (provisional response or final response) of a called subscriber B, and the called subscriber B transmission address (IP b, port b) is used for the selection (further processing or storage or rejection, etc.). Eventually, SIP terminal B goes off-hook, step 15, which signifies that a user of SIP terminal B is answering the call. Then, after a "200-OK" final response message has been forwarded by the called subscriber terminal B to the calling subscriber terminal (A) in steps 16, 17, and the successful ending of the call initiation is signaled, an established dialog between terminal A and terminal B is then established. At this point, any early media data streams which do not correspond to the established dialog established with the message 16/17 (and which therefore contain a different subscriber transmission address) can be rejected (e.g. suppressed or ignored) by the calling subscriber A. In FIG. 5, this means that the media stream data with transmission addresses other than (IP b, port b) is ignored. The SIP terminal A signaling part informs the SIP terminal A connection part in message 18 that only media stream data with the transmission address (IP b, port b) must be accepted, and the SIP terminal A connection part determines to accept only packets configured with (IP b, port b), step 19.

The SIP signaling server 186 transmits an SIP CANCEL message (step 20) from the SDP proxy to the further SIP terminal (B'), and SIP terminal B' stops transmitting early media data streams, step 21.

Accordingly, in FIG. 5, an SDP parameter is used in the provisional responses and/or final responses sent by a terminal of B to the SIP terminal of A, and this parameter permits the terminal(s) of caller B to express which IP address and which port is used in each case by these terminals to send IP packets. This is contrasted with other conventional art whereby the SDP from terminals B to A contains only information on the IP address and port at which terminal B wishes to receive IP packets. Because the provisional responses and/or final responses contain a unique identification of the SIP dialog, and the IP address used by a terminal B for transmission, and the port used for transmission, i.e. the source IP address and the source port, in packets of the corresponding media stream received by A, it is possible for A to carry out an unambiguous correlation (allocation) between an SIP dialog and a received media stream.

The terminal of A uses this correlation to select suitable media streams, e.g., according to one or more of the following: (i) when the first early dialog becomes an established dialog upon receipt of an SIP final response, the terminal of A selects the appropriate media stream, (ii) the terminal of A selects the early media corresponding to the early dialog last established—possibly for only as long as no established dialog yet exists, and/or (iii) terminal of A suppresses early-media media streams (user data) as soon as it sends SIP signaling messages to end the corresponding dialogs.

Accordingly, in the call set-up procedure of FIG. 5, the identities of call targets are conveyed in the early media (or early dialog) that arrives at the UE originator. Before an established dialog is available (i.e., before an SIP 200 OK (A3) message is relayed to the UE originator from the SIP signaling server 186 on behalf of a call target), the UE originator selects the early media corresponding to the early dialog last established. After one of the early dialogs becomes an established dialog (i.e., after an SIP 200 OK (A3) message is relayed to the UE originator from the SIP signaling server 186 on behalf of a call target), the UE originator selects the established dialog and suppresses the other media streams.

Embodiments of the invention are directed to early media management. FIGS. 6A through 6E each illustrate example embodiments of the present invention related to different scenarios whereby early media is received at a UE originator. As shown in FIGS. 6A through 6E, early media can arrive at the UE originator in conjunction with a number of scenarios, such as a forked session (e.g., FIG. 6A), call forwarding (e.g., FIG. 6B), color ring back tone (CRBT) (e.g., FIG. 6C), flexible alerting (e.g., FIG. 6D) and/or CBRT plus call forwarding (CF) (e.g., FIG. 6E). In FIGS. 6A through 6E, dx denotes an SIP dialog x (e.g., d1 corresponds to dialog 1), mx denotes a media stream associated with dx (e.g., m1 is associated with d1), and cx denotes the codec associated with dx (e.g., c1 is associated with d1).

In each of FIGS. 6A through 6E, it is assumed that a UE originator ("UE 1") prepares to receive early media on a first codec (e1) in a first SDP offer before receiving an SDP answer (i.e., an SIP 180 or 200 OK (A3) message) and that upon receiving the SDP answer, UE 1 plays the media on a negotiated codec associated with the early dialog or the confirmed or established dialog.

Figure 6A:
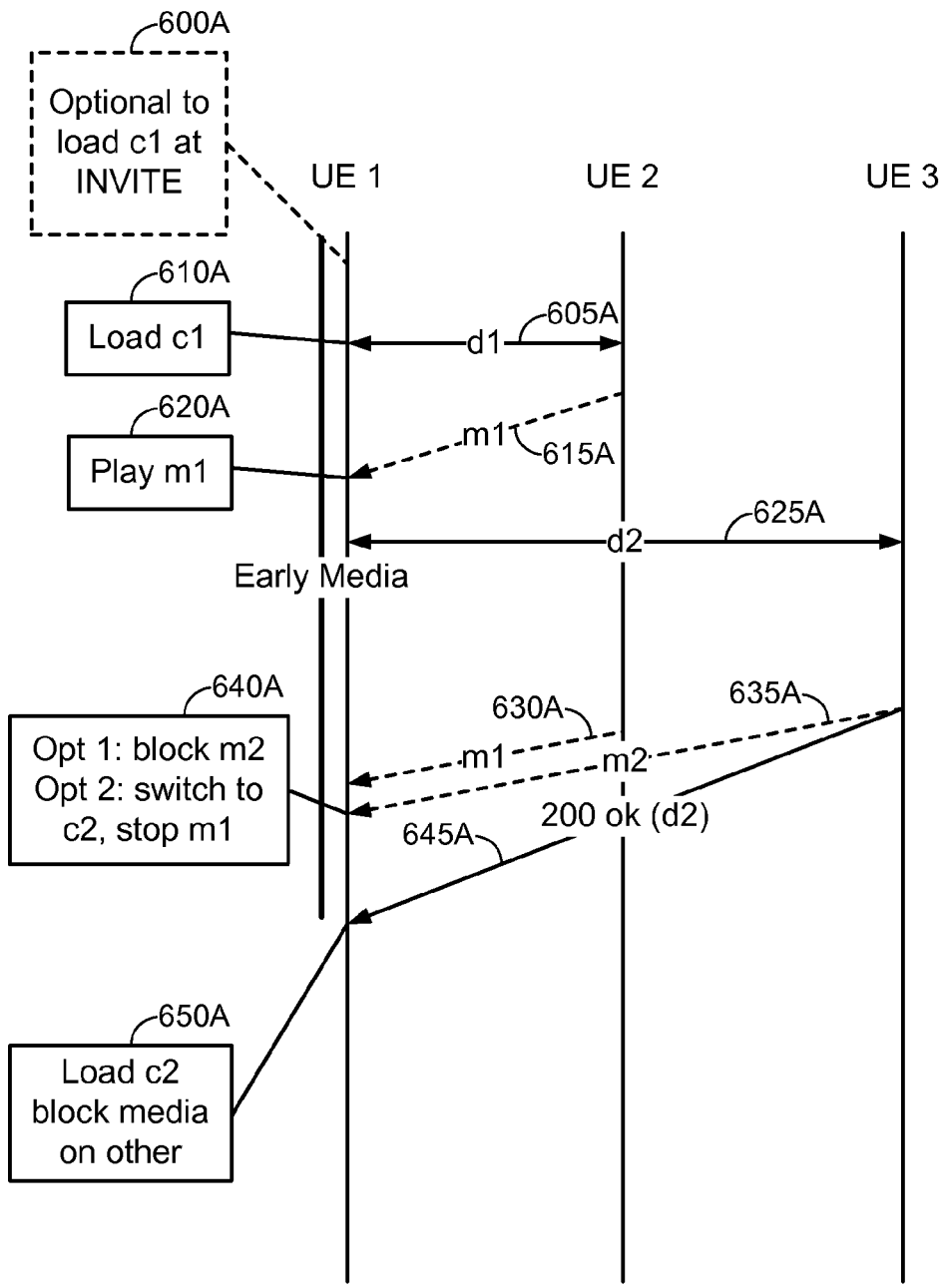
FIG. 6A illustrates early media received at a UE originator for a forked session in accordance with an embodiment of the invention.

In FIG. 6A, UE 1 optionally loads codec c1 in conjunction with sending INVITE messages to UEs 2 and 3, 600A, establishes dialog d1 with UE 1, 605A, loads c1 (if necessary), 610A, receives early media m1 from UE 2 in response to the INVITE message, 615A, and plays m1, 620A. UE 1 then establishes dialog d2 with UE 3, 625A, continues to receive early media m1 from UE 2, 630A and begins to receive early media m2 from UE 3, 635A. At this point, UE 1 can (i) invoke a first option and block m2 without loading c2 and continue playing m1, (ii) or invoke a second option switch to playing m2 based on c2 and stop playing m1, 640A. Eventually, an SIP 200 OK (A3) message confirming dialog d2 arrives at UE 1, 645A. For example, the SIP 200 OK (A3) message at 645A may be delayed somewhat from being routed through the SIP signaling server 186, which experiences more latency to UE 1 as compared to the media m2. Once the dialog d2 is confirmed, UE 1 loads c2 (if c2 is not already loaded from 640A) and blocks subsequent media from UE 2 associated with dialog d1, 650A.

Figure 6B:
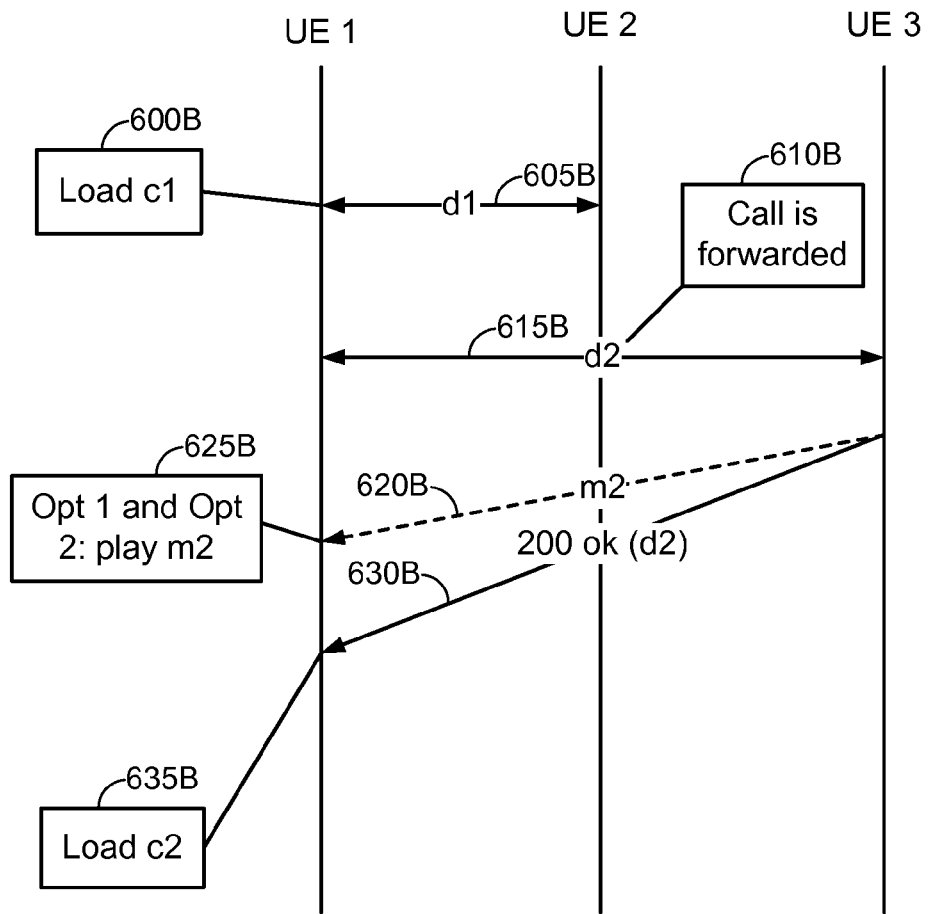
FIG. 6B illustrates early media received at a UE originator for a call forwarding scenario in accordance with an embodiment of the invention.

In FIG. 6B, UE 1 loads codec c1 in conjunction with sending an INVITE message to UE 2 600B, and establishes dialog d1 with UE 1, 605B. UE 2 facilitates the call to be forwarded to UE 3 via a network (not shown), 610B, such that a dialog d2 is established between UE 1 and UE 3, 615B. UE 1 then receives early media m2 from UE 2 in association with dialog d2, 620B, and plays m2, 625B (under either the first or second option discussed above with respect to FIG. 6A). Eventually, an SIP 200 OK (A3) message confirming dialog d2 arrives at UE 1, 630B. For example, the SIP 200 OK (A3) message at 630B may be delayed somewhat from being routed through the SIP signaling server 186, which generally experiences more latency on its connection to UE 1 as compared to the media m2. Once the dialog d2 is confirmed, UE 1 loads c2 (if c2 is not already loaded from 625B), 635B.

Figure 6C:
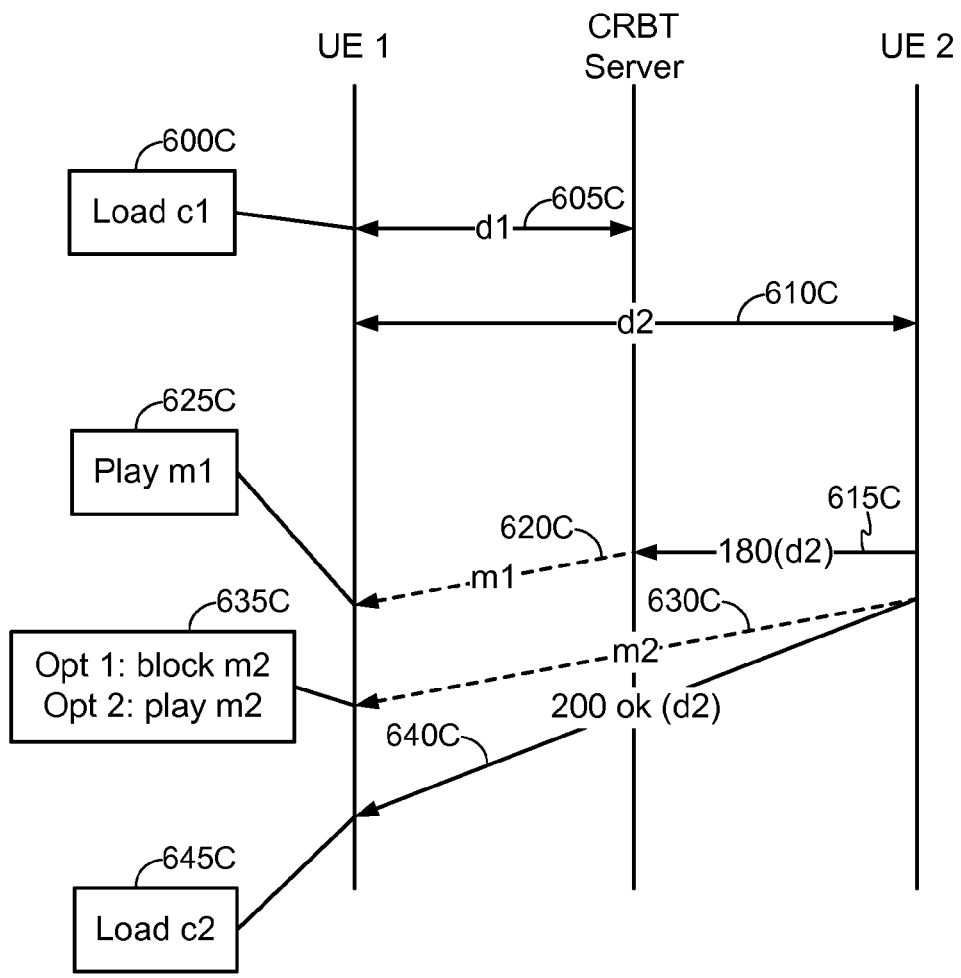
FIG. 6C illustrates early media received at a UE originator for a color ring back tone (CRBT) scenario in accordance with an embodiment of the invention.

In FIG. 6C, UE 1 loads codec c1 in conjunction with sending INVITE messages to UE 2, 600C, and establishes dialog d1 with the CRBT or announcement server, 605C, and also establishes dialog d2 with UE 2, 610C. UE 2 transmits an SIP 180 message in association with dialog d2 to the CRBT server in conjunction with alerting the user of UE 2 regarding the call, 615C, which prompts the CRBT server to begin sending early media m1 to UE 1, 620C (e.g., a ringtone). UE 1 receives and plays m1, 625C. UE 2 also begins to transmit early media m2 to UE 1, 630C. UE 1 then invokes either option 1 (e.g., play m1 and block m2 without loading c2) or option 2 (e.g., load c2 to play m2 and block m1) as discussed above with respect to 640A of FIG. 6A, 635C. Eventually, an SIP 200 OK (A3) message confirming dialog d2 arrives at UE 1, 640C. For example, the SIP 200 OK (A3) message at 640C may be delayed somewhat from being routed through the SIP signaling server 186, which generally experiences more latency on its connection to UE 1 as compared to the media m2. Once the dialog d2 is confirmed, UE 1 loads c2 (if c2 is not already loaded from 635C) and blocks subsequent media from the CRBT server associated with dialog d1, 645C.

Figure 6D:
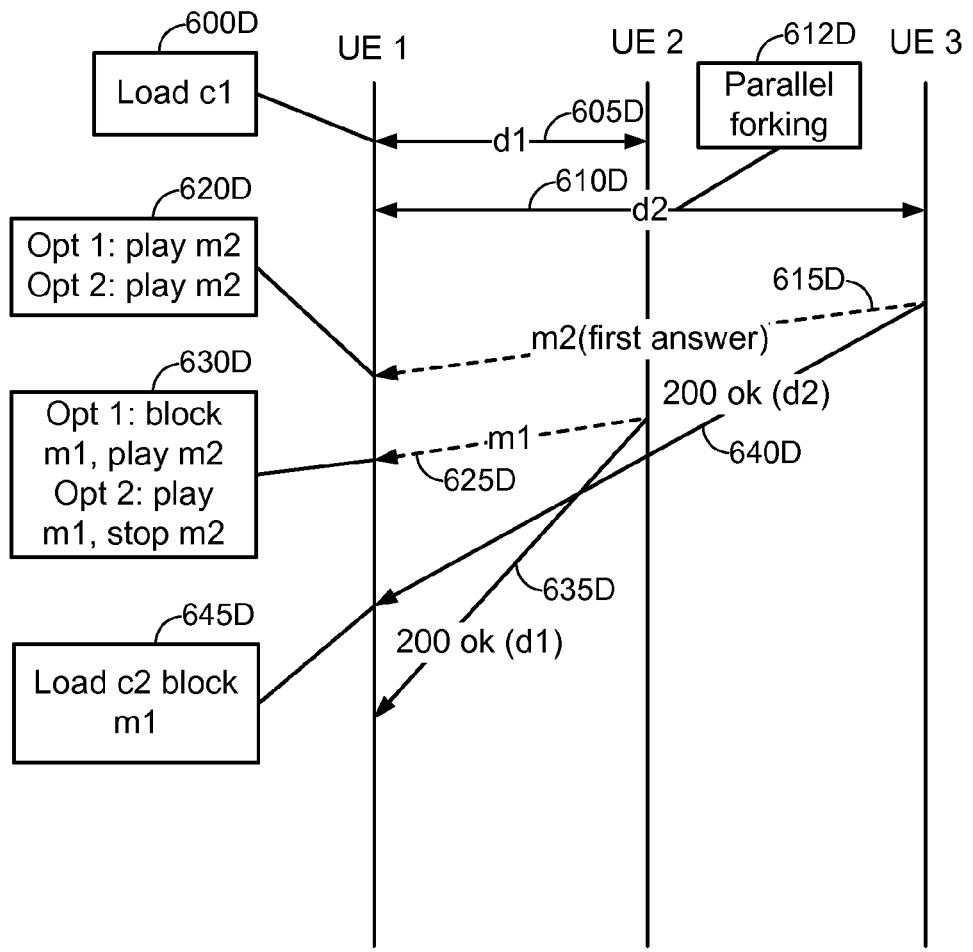
FIG. 6D illustrates early media received at a UE originator for a flexible alerting scenario in accordance with an embodiment of the invention.

In FIG. 6D, UE 1 loads codec c1 in conjunction with sending INVITE messages to UEs 2 and 3, 600D, and establishes dialog d1 with UE 2, 605D. UE 1 also establishes dialog d2 with UE 3, 610D, via a parallel fork, 612D. UE 3 responds with early media m2, 615D, and UE 1 plays m2, 620D (under either the first or second option discussed above with respect to FIG. 6A). Next, UE 2 sends early media m1, 625D, and UE 1 then invokes either option 1 (e.g., play m1 and block m2 without loading c2) or option 2 (e.g., load c2 to play m2 and block m1) as discussed above with respect to 640A of FIG. 6A, 630D. Next, assume that both UEs 2 and 3 attempt to confirm their respective dialogs d1 and d3 by sending SIP 200 OK (A3) messages at 635D and 640D. As shown in FIG. 6D, UE 2 begins its transmission at 635D before UE 3 begins its transmission at 640D, but UE 3's SIP 200 OK (A3) message arrives at UE 1 first. Accordingly, UE 1 loads c2 (if necessary), begins (or continues) playing m1 and blocks m2, 645D.

Figure 6E:
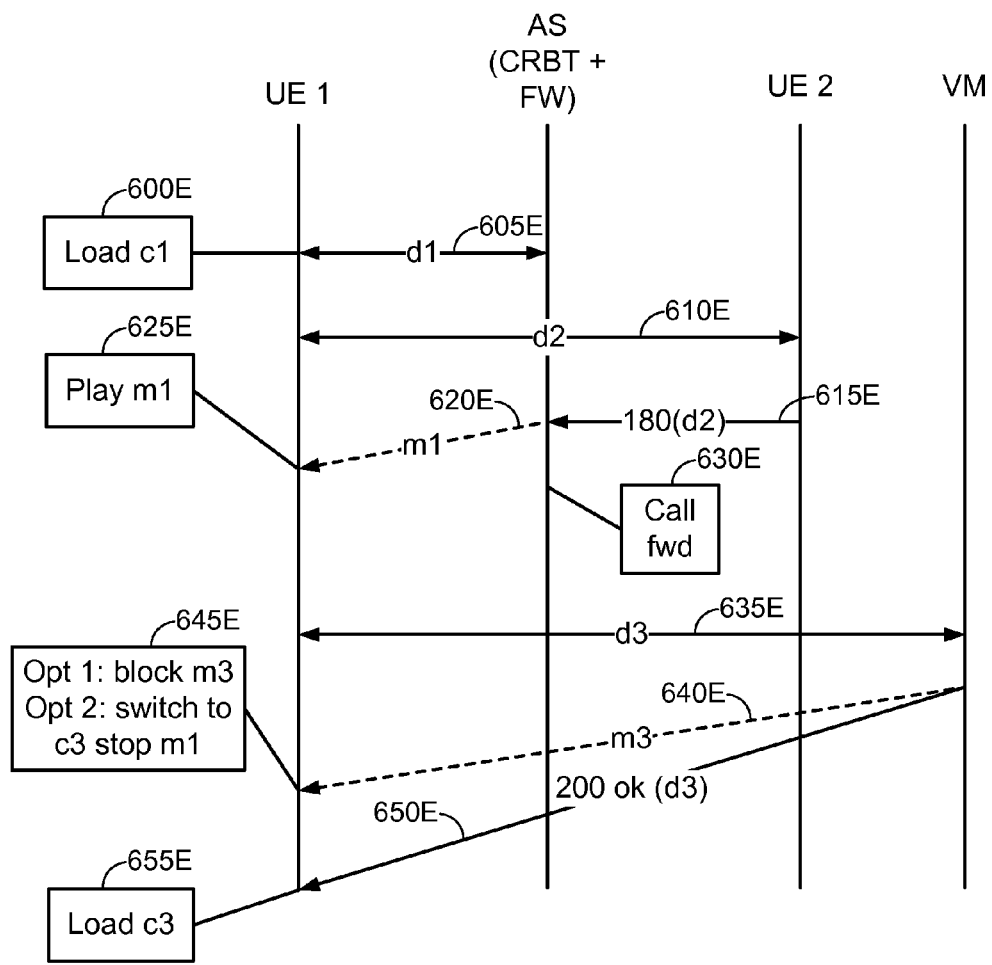
FIG. 6E illustrates early media received at a UE originator for a CRBT plus call forwarding scenario in accordance with an embodiment of the invention.

In FIG. 6E, UE 1 loads codec c1 in conjunction with sending INVITE messages to UE 2, 600E, and establishes dialog d1 with the SIP server 186, 605D. UE 1 also establishes dialog d2 with UE 2, 610E. UE 3 responds with an SIP 180 message, 615E, which prompts the server to begin sending early media m1, 620E. UE 1 receives and begins to play m1, 625E. The server then forwards the call to a voicemail (VM) server, 630E, and dialog d3 is set-up between UE 1 and the VM server, 635E. VM sends early media m3 to UE 1, 640E, and UE 1 then invokes either option 1 (e.g., play m1 and block m3 without loading c3) or option 2 (e.g., load c3 to play m3 and block m1) as discussed above with respect to 640A of FIG. 6A, 645E. Next, assume that the VM server confirms dialog d3 by sending an SIP 200 OK (A3) message at 650E. Accordingly, UE 1 loads c3 (if necessary), begins (or continues) playing m3 and blocks m1, 655E. Also, the SIP signaling server 186 stops providing m1 to UE 1 after the VM server answers at 650E, but there may be a brief overlap where m1 and m3 are both provided to UE 1 (although UE 1 will cease to play m1 after 645E).

In the description of FIGS. 6A through 6E above, the "first option" with respect to early media selection corresponds to a dynamic selection of an earlier received media stream and the "second option" corresponds to a dynamic selection of a later received media stream. These respective options are described below in more detail with respect to FIG. 7 and FIGS. 8A-8B, respectively. Table 1 (below) illustrates the behavior of UE 1 (originating UE) with regard to the early media selection for FIGS. 6B through 6E:

TABLE 1

| Scenario | UE Behavior with First Option | UE Behavior with Second Option |
|---|---|---|
| Call Forwarding (FIG. 6B) | Switching to m2 can occur when media arrives, assuming media will arrive before SIP 200 OK (A3) | Switching to m2 can occur when media arrives, assuming media will arrive before SIP 200 OK (A3) |
| CRBT (FIG. 6C) | Switching to m2 can only occur after SIP 200 OK (A3) arrives and some media may be clipped while CRBT is continued to be played | Switching to m2 can occur when media arrives, assuming media will arrive before SIP 200 OK (A3) |
| Flexible Alerting (FIG. 6D) | At most a single switch will occur when dialog is confirmed. | If the latter of d1 and d2 become confirmed before the earlier 200 OK reaches the UE, m1 and m2 will briefly overlap. Thus in the worst case, this will cause two switches to happen as shown in Part (d) of the figure. The worst case scenario would not occur if the first dialog was answered sufficiently before |

TABLE 1-continued

| Scenario | UE Behavior with First Option | UE Behavior with Second Option |
|---|---|---|
| | | the second or only a single dialog was answered. |
| CRBT + CF (FIG. 6E) | Switching to m3 can only occur after 200 OK arrives and some media may be clipped while CRBT is continued to be played | Switching to m3 can occur when media arrives, assuming media will arrive before 200 OK |

Additional description of the decision logic that can be implemented by UE 1 at 640A of FIG. 6A, 625B of FIG. 6B, 635C of FIG. 6C, 620D or 630D of FIG. 6D and/or 645E of FIG. 6E will now be described in more detail.

Figure 7:
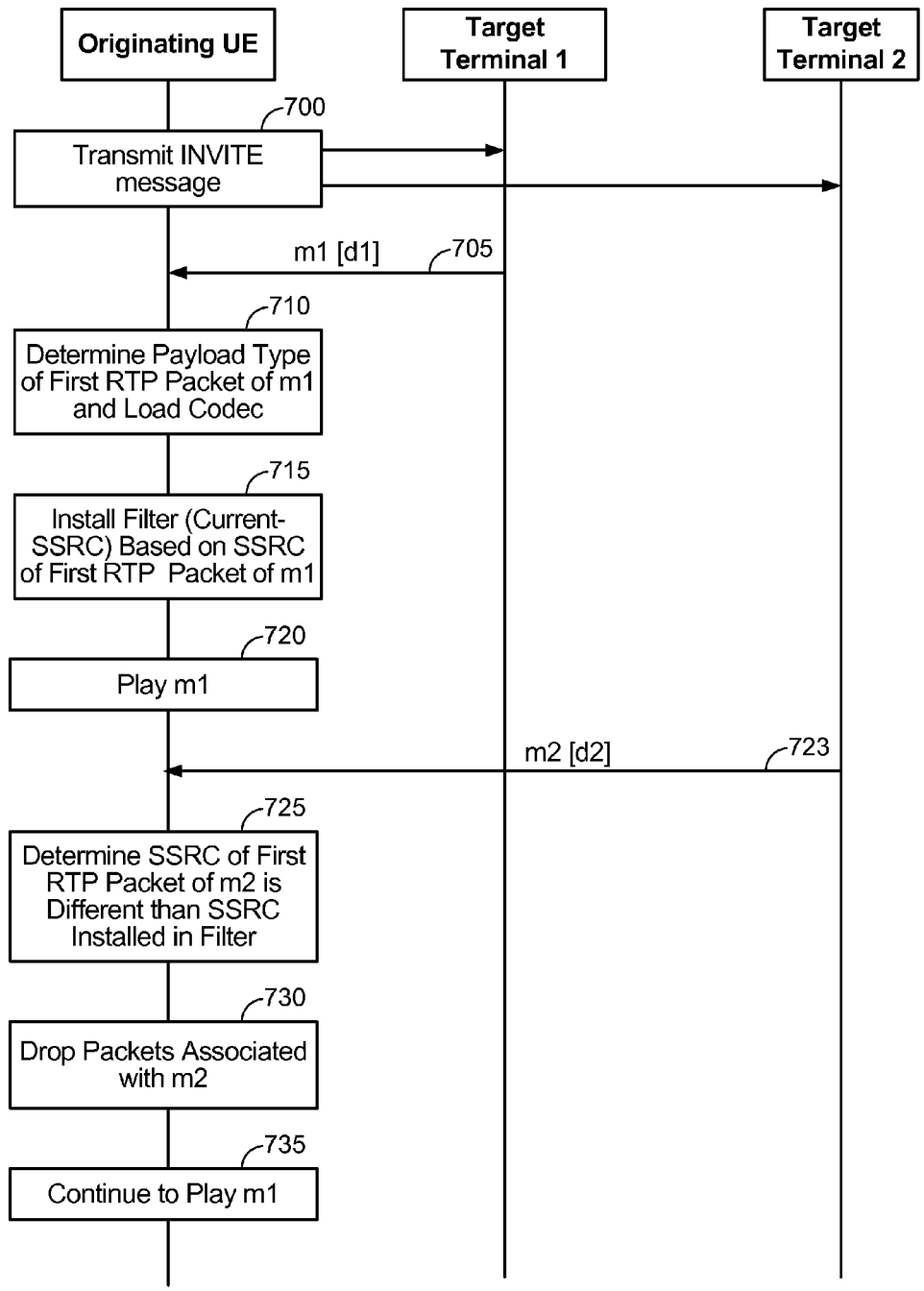
FIG. 7 illustrates a dynamic option for codec switching in conjunction with early media associated with an SIP-based communication session in accordance with an embodiment of the invention.

FIG. 7 illustrates a dynamic option for codec switching in conjunction with early media associated with an SIP-based communication session in accordance with an embodiment of the invention. In particular, FIG. 7 illustrates a scenario where a first early media stream with an initial packet arriving at the originating UE first is prioritized over subsequent early media streams with initial packets that arrive at the originating UE after the first early media stream.

Referring to FIG. 7, an originating UE transmits an INVITE message that arrives at target terminals 1 and 2, 700. For example, the INVITE message may be sent to both target terminals 1 and 2 by the originating UE, or the INVITE message may originally arrive at target terminal 1 and then be forwarded to target terminal 2 as in the call forwarding scenario of FIG. 6B, etc. Also, the target terminals 1 and 2 can each correspond to UEs in an example. Alternatively, one or more of the target terminals 1 and 2 can correspond to a CRBT server as in FIG. 6C, an AS (CRBT+FW) server as in FIG. 6E and/or a VM as in FIG. 6E.

After transmitting the INVITE message at 700, the originating UE establishes an early dialog d1 with target terminal 1 and begins to receive early media m1 from target terminal 1, 705. The originating UE inspects the first RTP packet of the early media m1, 710, and loads an associated codec c1 for m1. The originating UE also installs a filter based upon a synchronization source identifier (SSRC) contained within a header of the first RTP packet of m1, 715, and then begins to play m1, 720. For example, the filter of 715 may correspond to a Current-SSRC parameter that indicates an SSRC value for acceptable packets (i.e., packets of a dialog that are not to be dropped by the originating UE). The originating UE establishes an early dialog d2 with target terminal 2 and, at some time after 705, begins to receive early media m2 from target terminal 2, 723. The originating UE inspects the first RTP packet of the early media m2 and determines that the SSRC in the first RTP packet of m2 is different than the SSRC installed in the filter, 725. Based on the determination of 725, the originating UE drops packets associated with m2, 730, and continues to play m1, 735.

Figure 8A:
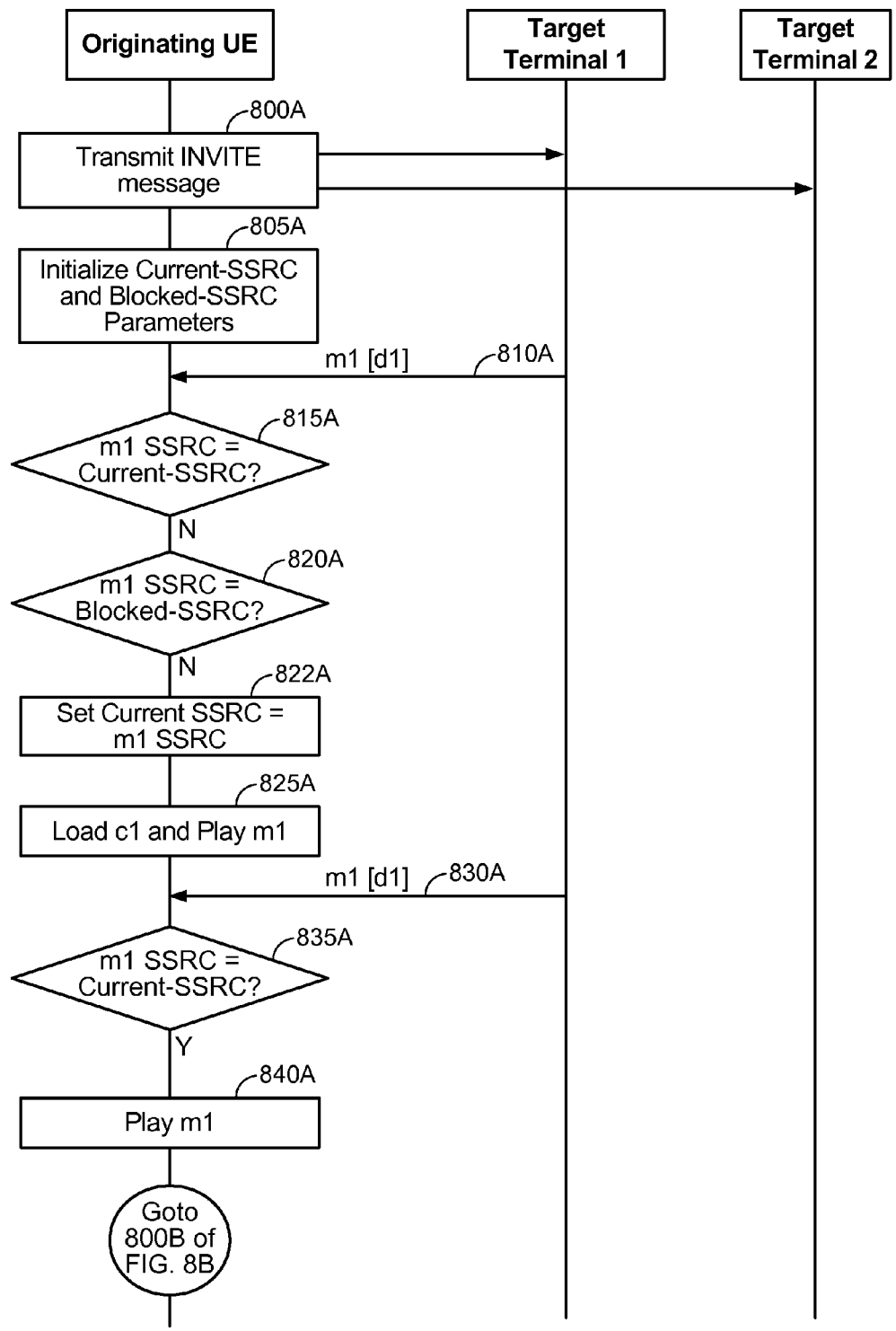
FIGS. 8A and 8B illustrate a dynamic option for codec switching in conjunction with early media associated with an SIP-based communication session in accordance with an embodiment of the invention.
Figure 8B:
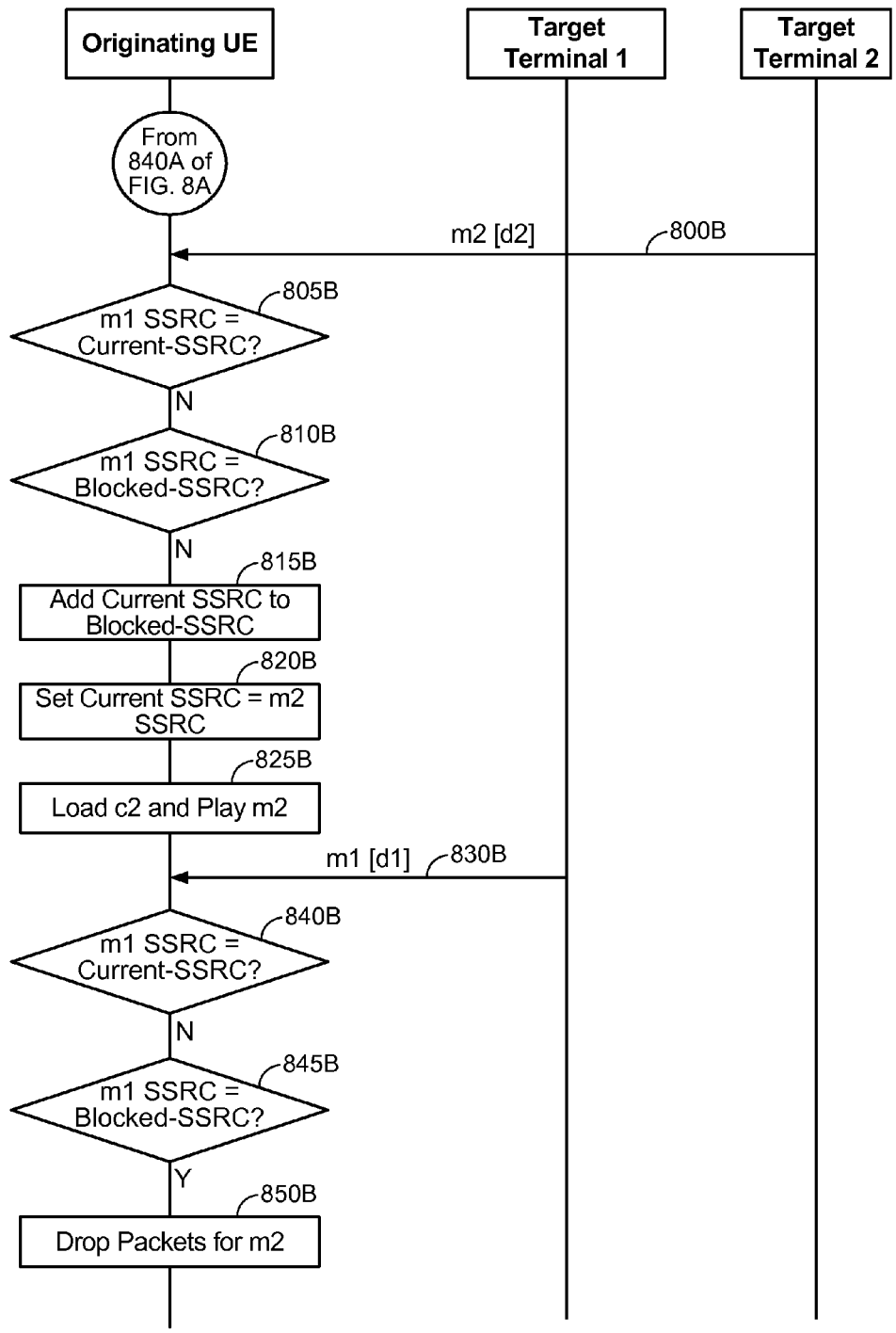

FIGS. 8A and 8B illustrate a dynamic option for codec switching in conjunction with early media associated with an SIP-based communication session in accordance with an embodiment of the invention. In particular, FIGS. 8A and 8B illustrate a scenario where an early media stream with a latest-arriving initial packet arriving at the originating UE is prioritized over early media streams with earlier-arriving initial packets that arrive at the originating UE before the latest-arriving early media stream. Also, unlike FIG. 5, the codec switching that occurs in FIGS. 8A-8B is based upon information (e.g., SSRC, etc.) contained in the media packets (e.g., m1, m2, etc.). In FIG. 5, the source address in the signaling packets (not the media packets) is used to switch between early media, and as noted above, the signaling packets arrive on a signaling connection that experiences more latency than the corresponding media connection.

Referring to FIG. 8A, an originating UE transmits an INVITE message that arrives at target terminals 1 and 2, 800A (e.g., similar to 700 of FIG. 7). After transmitting the INVITE message at 800A, the originating UE initializes a current-SSRC variable to an invalid SSRC number (i.e., a non-permitted SSRC number, to reduce the chance or even make it impossible that an incoming RTP packet would actually have the same SSRC number) and also initializes a Blocked-SSRC list to null (or empty), 805A. The originating UE establishes an early dialog d1 with target terminal 1 and begins to receive early media m1 from target terminal 1, 810A. The originating UE inspects a header of the first RTP packet of the early media m1 to acquire the first RTP packet's SSRC and determines whether the first RTP packet's SSRC equals Current-SSRC, 815A. Because Current-SSRC has been initialized to an invalid SSRC at this point, the originating UE determines that the first RTP packet's SSRC from m1 does not equal Current SSRC at 815A. At 820A, the originating determines whether the first RTP packet's SSRC is listed in the Blocked-SSRC list. Because the Blocked-SSRC list has been initialized to null (empty) at this point, the originating UE determines that the first RTP packet's SSRC from m1 is not included in the Blocked-SSRC list at 820A.

Accordingly, the originating UE sets Current-SSRC equal to the first RTP packet's SSRC from m1, 822A, and the originating UE loads codec c1 for m1 and begins to play m1, 825A. Thereafter, as more RTP packets for m1 arrive at the originating UE in association with dialog d1, 830A, the originating UE determines that the SSRC of the incoming m1 RTP packets equal Current-SSRC, 835A, and the originating UE continues to play m1, 840A.

Referring now to FIG. 8B, the originating UE establishes an early dialog d2 with target terminal 2 and, at some time after 840A of FIG. 8A, begins to receive early media m2 from target terminal 2, 800B. The originating UE inspects a header of the first RTP packet of the early media m2 to acquire the first RTP packet's SSRC and determines whether the first RTP packet's SSRC equals Current-SSRC, 805B. Because Current-SSRC is set to m1's SSRC at this point, the originating UE determines that the first RTP packet's SSRC from m2 does not equal Current SSRC at 805B. At 810B, the originating determines whether the first RTP packet's SSRC from m2 is listed in the Blocked-SSRC list. Because the Blocked-SSRC list is still empty at this point, the originating UE determines that the first RTP packet's SSRC from m2 is not included in the Blocked-SSRC list at 810B.

Accordingly, the originating UE moves the current value of Current-SSRC (i.e., m1's SSRC) to the Blocked-SSRC list, 815B, sets Current-SSRC equal to the first RTP packet's SSRC from m2, 820B, and the originating UE loads codec c2 for m2 and begins to play m2, 825B. Thereafter, as more RTP packets for m1 arrive at the originating UE in association with dialog d1, 830B, the originating UE determines that the SSRC of the incoming m1 RTP packet no longer equals Current-SSRC, 840B, the originating UE determines that the SSRC of the incoming m1 RTP packet is included in the Blocked-SSRC list, 845B, and any early media from m1 is dropped, 850B.

Figure 9:
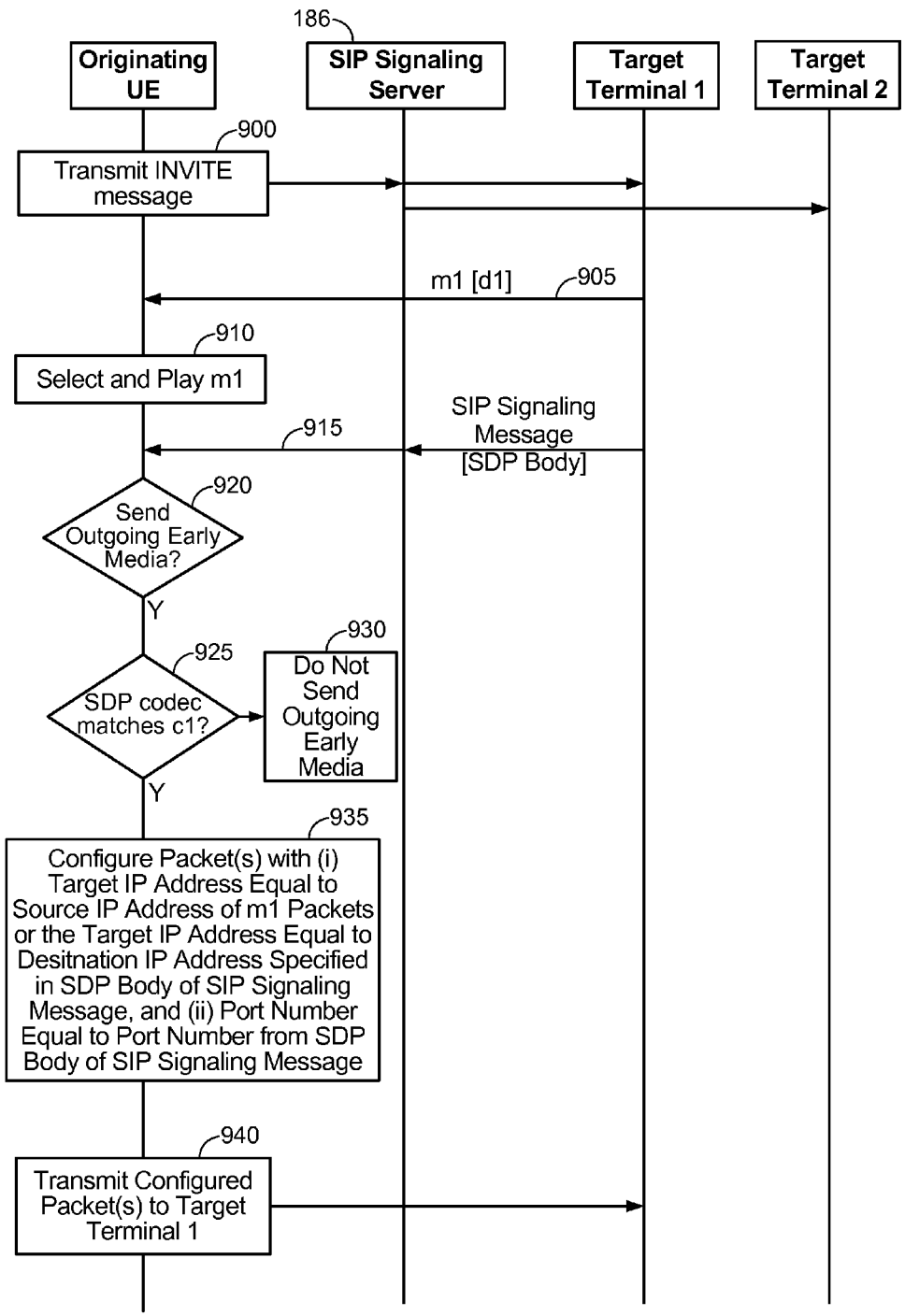
FIG. 9 illustrates a process of transmitting media to a target terminal from a UE originator in accordance with an embodiment of the invention.

FIG. 9 illustrates a process of transmitting media to a target terminal from a UE originator in accordance with an embodiment of the invention. Referring to FIG. 9, an originating UE transmits an INVITE message that arrives at target terminals 1 and 2, 900 (e.g., similar to 700 of FIG. 7). After transmitting the INVITE message at 900, the originating UE establishes an early dialog d1 with target terminal 1 and begins to receive early media m1 from target terminal 1, 905. Assume that the originating UE selects and begins to play m1 in accordance with any of the decision logic described above, 910 (e.g., m1 is associated with the first received dialog, the last received dialog, etc.). Referring to FIG. 9, the originating UE receives an SIP signaling message that carries an SDP body at 915. For example, the SIP signaling message can correspond to an SIP 180 message, an SIP 181 message, a provisional SIP 200 OK (A1) message, etc.

In 920, the originating UE determines whether to transmit early media. For example, the UE originator may attempt interaction with a server before the call set-up procedure is finalized (e.g., before an established dialog is achieved based on a 200 OK (A3) message). For example, the originating UE may be required to transmit DTMF for dialed digits/pin/options in the case of a "calling card" service, and so on.

In 920, assume that the originating UE determines to transmit early media. In 925, the originating UE determines whether a codec associated with the SDP body from the SIP signaling message from 915 matches the current codec (i.e., c1) being used to play m1 (i.e., the current media being played in association with the selected dialog) and the source IP address of the incoming stream m1 matches the IP address contained in the connection line of the SDP body of the SIP signaling message from 915. If not, the originating UE does not send the early media, 930. Otherwise, if the SDP body from the SIP signaling message from 915 matches c and the source IP address of the incoming stream m1 matches the IP address contained in the connection line of the SDP body of the SIP signaling message from 915, the originating UE configures its outgoing RTP media packets to include (i) a target IP address equal to a source IP address from the m1 packets of 905 and (ii) a port number equal to a port number from the SDP body of the SIP signaling message of 915, 935. This relies on the typical behavior where the source and destination IP addresses of an endpoint terminal (i.e., target terminal 1) are identical.

In an alternative example, in 935, if the SDP body of the SIP signaling message from 915 specifically or explicitly identifies the media source of m1 (e.g., target terminal 1) by specifying the SSRC as an SDP attribute, and the SSRC associated with selected stream m1 matches the value of this SDP attribute, the source IP address from the RTP stream m1 need not be used to generate the outgoing media stream. Instead, the SDP body of the SIP signaling message from 915, which can be identified via the SSRC matching, contains the destination IP address and port number to send media to the target terminal 1. In this instance, the source and destination addresses of stream m1 could be different. In either case, the originating UE transmits the configured packet(s) from 935 to the target terminal 1, 940.

Figure 10A:
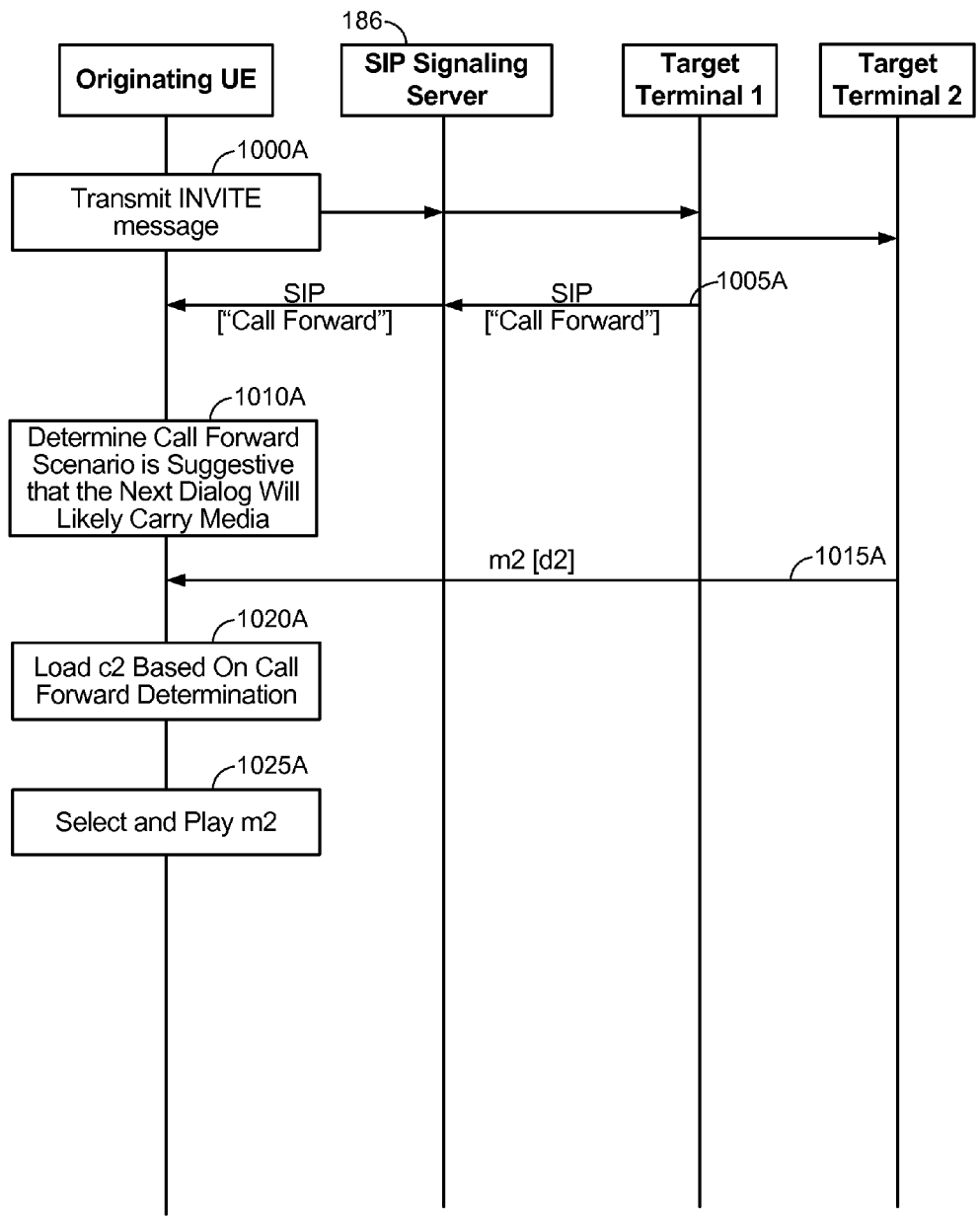
FIG. 10A illustrates a context-specific early media handling procedure for a call forward scenario in accordance with an embodiment of the invention.

FIG. 10A illustrates a context-specific early media handling procedure for a call forward scenario in accordance with an embodiment of the invention. For example, the process of FIG. 10A can be implemented in conjunction with the processes of FIGS. 6B and/or 6E as described above.

Referring to FIG. 10A, an originating UE transmits an INVITE message that arrives at target terminals 1 and 2, 1000A (e.g., similar to 700 of FIG. 7). After transmitting the INVITE message at 1000A, the originating UE receives an SIP signaling message (e.g., an SIP 181 message) that contains an SDP body from the target terminal 1 via the SIP signaling server 186, 1005A. In the embodiment of FIG. 10A, assume that the SDP body within the SIP signaling message from 1005A is configured to indicate that the call is being forwarded by the target terminal. Accordingly, the originating UE inspects the SDP body of the SIP signaling message from 1005A, determines that the call is being forwarded such that the next dialog is likely to carry relevant media for the call instead of the dialog associated with target terminal 1, 1010A. Eventually, dialog d2 is established between the originating UE and target terminal 2, and the originating UE begins to receive early media m2 associated with d2, 1015A. The originating UE loads codec c2 for m2 based on the call forward determination from 1010A because m2 is the next-arriving early media following the call forward detection, 1020A, and the originating UE selects and plays m2 based on c2, 1025A. While FIG. 10A describes an example whereby the call forwarding context is indicated via the SDP body of the SIP signaling message, it will be appreciated that the call forwarding context can be contained in another portion of the SIP signaling message in another embodiment of the invention (i.e., other than the SDP body).

Figure 10B:
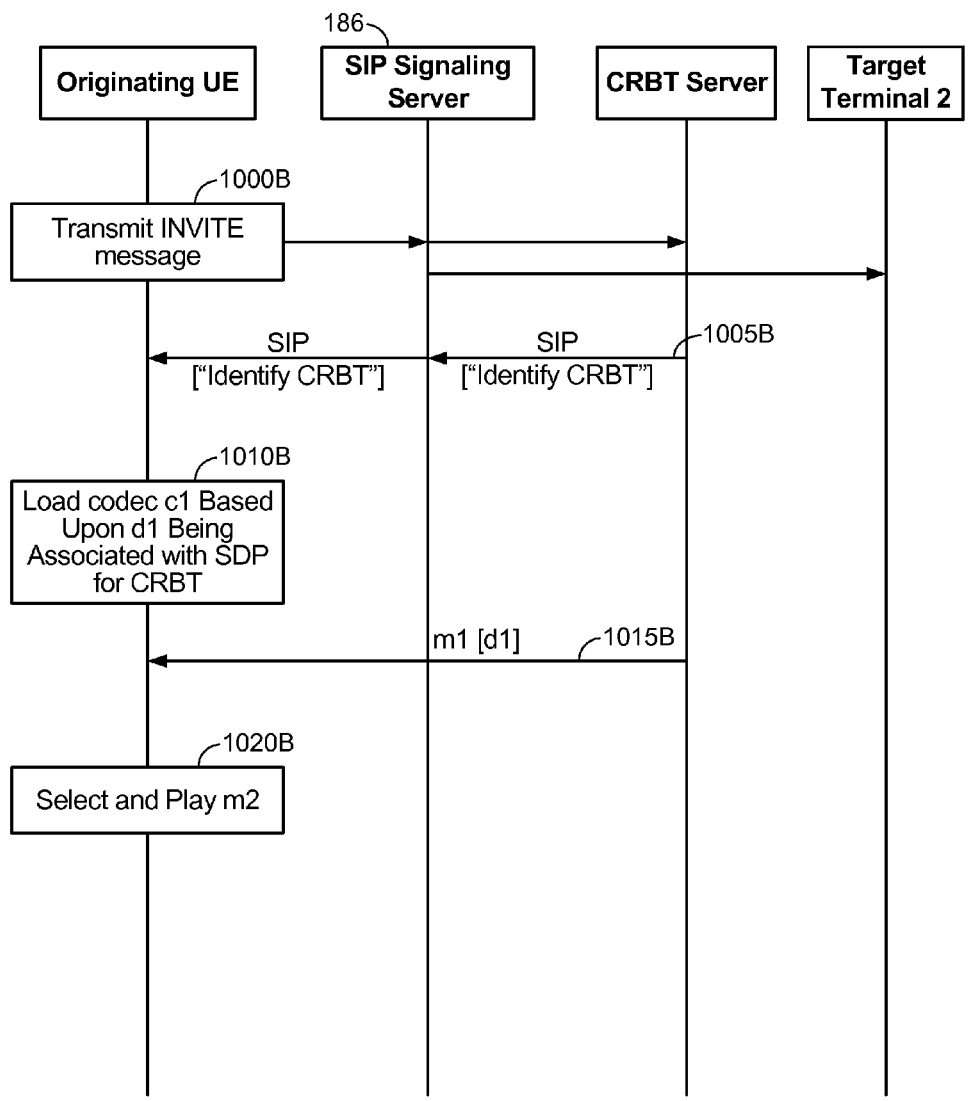
FIG. 10B illustrates a context-specific early media handling procedure for a CRBT scenario in accordance with an embodiment of the invention.

FIG. 10B illustrates a context-specific early media handling procedure for a CRBT scenario in accordance with an embodiment of the invention. For example, the process of FIG. 10B can be implemented in conjunction with the processes of FIGS. 6C and/or 6E as described above.

Referring to FIG. 10B, an originating UE transmits an INVITE message that arrives at the CRBT server and target terminal 1, 1000B. After transmitting the INVITE message at 1000B, the originating UE receives an SDP body within an SIP signaling message (e.g., an SIP 180 message) from the CRBT server via the SIP signaling server 186, such as an SIP 180 message, 1005B. In the embodiment of FIG. 10B, assume that the SDP body within the SIP signaling message from 1005B includes an attribute that is configured to identify a codec used by the CRBT server for its dialog with the originating UE. Accordingly, the originating UE inspects the SDP body of the SIP signaling message from 1005B, determines the codec for the CRBT server's dialog ("c1") and loads the CRBT's codec at 1010B. The originating UE receives early media m1 from the CRBT server via dialog d1, 1015B, and the originating UE selects and plays the early media m1, 1020B. While FIG. 10B describes an example whereby the CRBT context is indicated via the SDP body of the SIP signaling message, it will be appreciated that the CRBT context can be contained in another portion of the SIP signaling message in another embodiment of the invention (i.e., other than the SDP body).

Figure 10C:
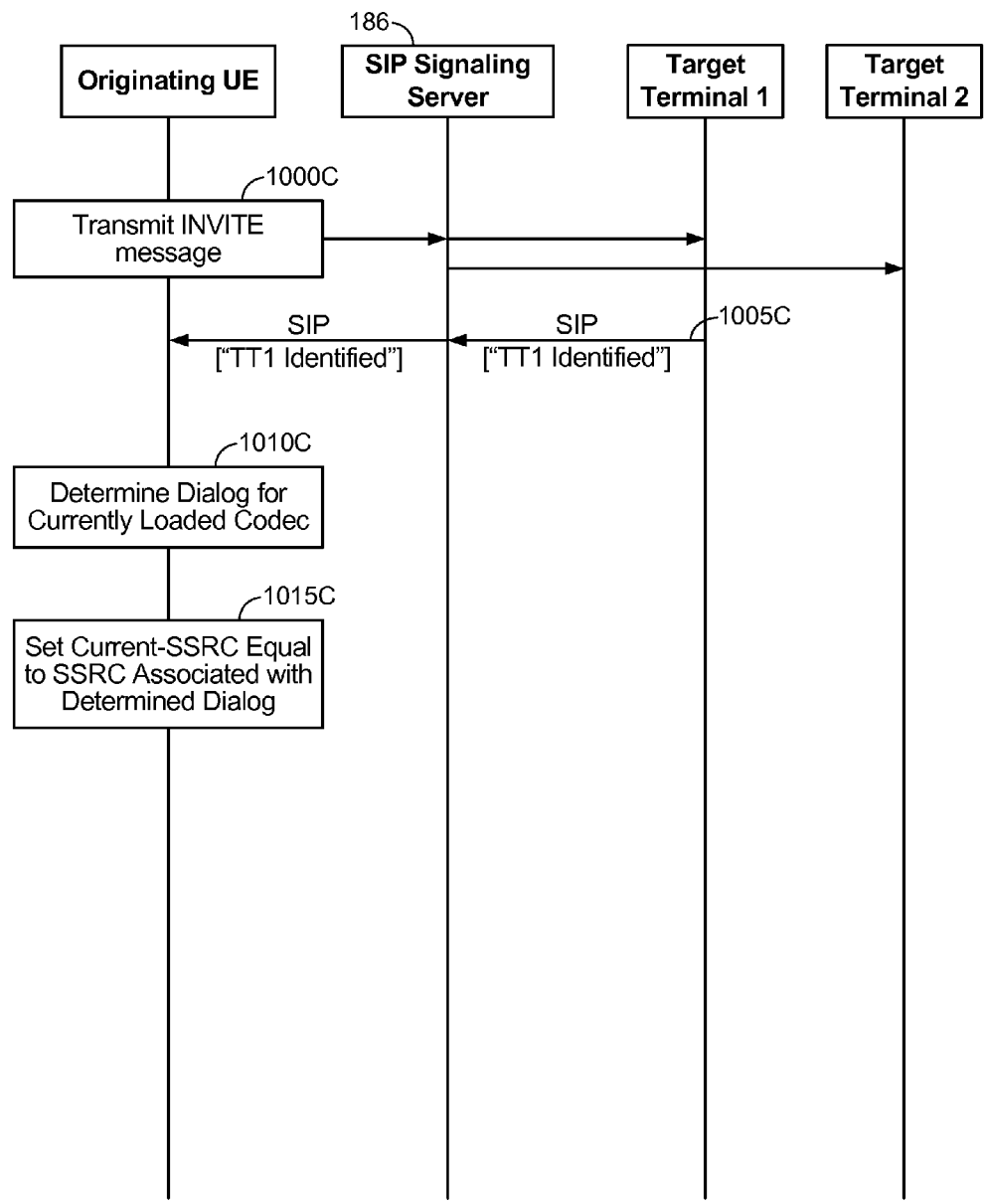
FIG. 10C illustrates a context-specific early media handling procedure for a scenario where a media source is identified in an SIP signaling message in accordance with an embodiment of the invention.

FIG. 10C illustrates a context-specific early media handling procedure for a scenario where a media source is identified in an SIP signaling message in accordance with an embodiment of the invention. For example, the process of FIG. 10C can be implemented in conjunction with any of the processes described above.

Figure 11A:
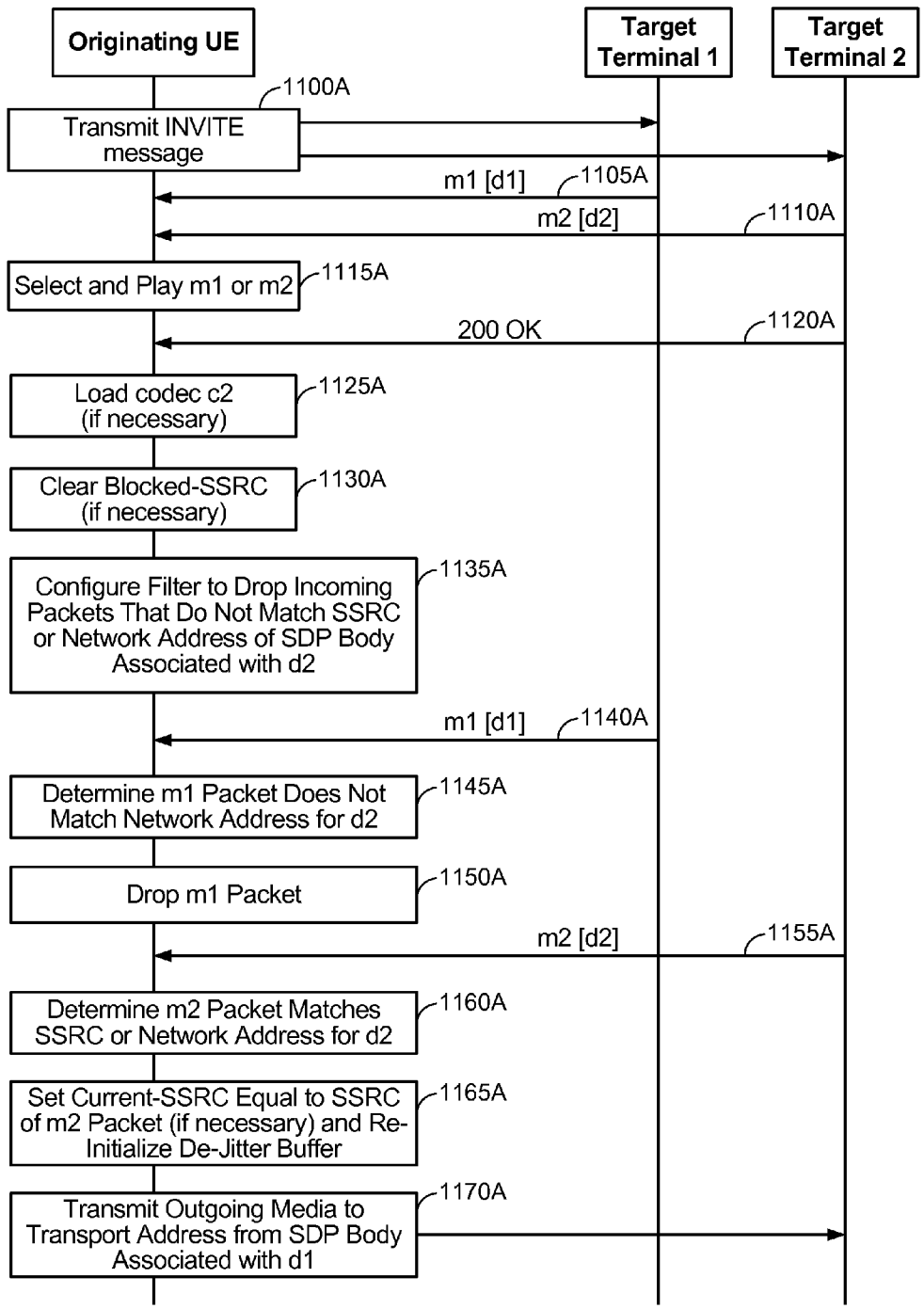
FIG. 11A illustrates a process of media handling for an established dialog after a dialog for early media is confirmed with an SIP 200 OK (A3) message in accordance with an embodiment of the invention.

Referring to FIG. 10C, an originating UE transmits an INVITE message that arrives at target terminals 1 and 2, 1000C. After transmitting the INVITE message at 1000C, the originating UE receives an SDP body within an SIP signaling message (e.g., an SIP 181 message) from the target terminal 1 via the SIP signaling server 186, 1005C. In the embodiment of FIG. 10C, assume that the SDP body within the SIP signaling message from 1005C is configured to identify the source of media sent from the target terminal 1. The originating UE determines a dialog associated with a currently loaded codec (e.g., the target terminal's codec or some other codec), 1010C, and then sets Current-SSRC (e.g., as used in FIGS. 7 through 8B, above) equal to the SSRC associated with the determined dialog, 1015C (e.g., the SSRC in packet headers of packets from the early media corresponding to the determined dialog). Accordingly, as will be appreciated from a review of FIG. 10C, the originating UE can play RTP packets whose SSRC match that of the desired dialog (e.g., latest arriving dialog or the first arriving dialog). This is different from playing media associated with the latest arriving stream because the latest arriving stream is not necessarily associated with the latest dialog. Further when a dialog is confirmed as shown in FIG. 11A (below), the SSRC can once again be retrieved from the SDP body associated with that dialog, and only packets associated with that SSRC can be played. Thus, by including the SSRC in the SDP body of the SIP signaling message (which is not conventional), stream identification becomes easier at the originating UE. While FIG. 10C describes an example whereby the media source is indicated via the SDP body of the SIP signaling message, it will be appreciated that the media source can be contained in another portion of the SIP signaling message in another embodiment of the invention (i.e., other than the SDP body).

Figure 11B:
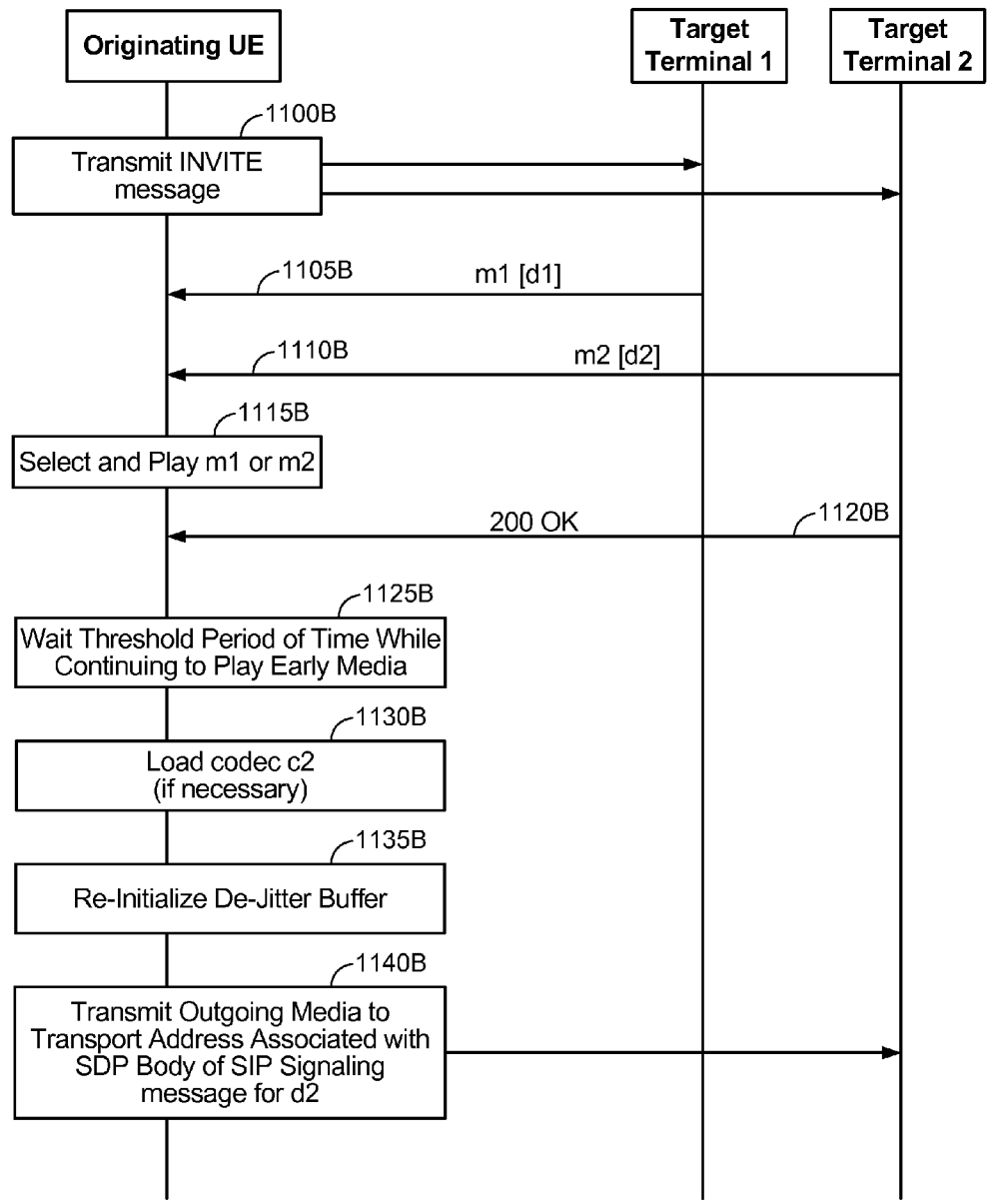
FIG. 11B illustrates a process of media handling for an established dialog after a dialog for early media is confirmed with an SIP 200 OK (A3) message in accordance with another embodiment of the invention.

While most of the embodiments described above relate to handling of early media, FIGS. 11A and 11B are related to media handling for an established dialog after a dialog for early media is confirmed with an SIP 200 OK (A3) message.

Referring to FIG. 11A, an originating UE transmits an INVITE message that arrives at target terminals 1 and 2, 1100A. After transmitting the INVITE message at 1100A, the originating UE establishes early dialogs d1 and d2 with target terminals 1 and 2, respectively, and receives early media m1 and m2 for dialogs d1 and d2, respectively, 1105A and 1110A. Assume that one of the early media selection procedures discussed above are implemented, such that the originating UE selects the codec associated with either m1 or m2 and then begins to play the early media for the selected codec, 1115A. Eventually, a 200 OK (A3) message is received from one of the target terminals, which confirms its associated dialog (d1 or d2), 1120A. At this point, subsequent media from the confirming target terminal is confirmed media (not "early" media).

In the embodiment of FIG. 11A, the SIP 200 OK (A3) message is received from target terminal 2 for confirming dialog d2 at 1120A. In response to the 200 OK (A3) message, the originating UE loads codec c2 (if necessary) and begins to play m2, 1125A. For example, if dialog d2 was already selected at 1115A, then codec c2 would already be loaded at 1125A so that the codec loading operation of 1125A could be bypassed. The originating UE also clears the Blocked-SSRC list (if necessary), 1130A. For example, if the selection of 1115A was not based on an embodiment that uses the Blocked-SSRC list, the Blocked-SSRC would not need to be cleared at 1130A. Alternatively, if the Blocked-SSRC list was still empty (or null), the Blocked-SSRC would not need to be cleared at 1130A.

Referring to FIG. 11A, the originating UE configures a filter to drop packets that do not match a network address (e.g., an SSRC, an IP address) associated with the confirmed dialog d2. For example, the network address added to the filter in 1135A can be extracted from an SDP body of the 200 OK (A3) message from 1120A, in an example. For example, if the SDP body of the 200 OK (A3) message contains the SSRC of target terminal 2, then the SSRC can be used as the network address that is added to the filter in 1135A. Alternatively, if the SDP body of the 200 OK (A3) message did not contain the SSRC of target terminal 2, then the IP address of target terminal 2 can be used as the network address that is added to the filter in 1135A.

Referring to FIG. 11A, the originating UE receives media m1 for dialog d1 at 1140A, and the originating UE determines that the m1 packet(s) do not match the network address or SSRC for d2 in the filter, 1145A. Accordingly, the m1 packet(s) are dropped at 1150A. The originating UE also receives media m2 for confirmed dialog d2 at 1155A, and the originating UE determines that the m2 packet(s) match the network address or SSRC for d2 in the filter, 1160A. The originating UE sets Current-SSRC equal to the SSRC for the m2 packet (if necessary) and re-initializes the de jitter buffer, 1165A. For example, the de-jitter buffer may be re-initialized if the SSRC of the confirmed media stream (m2 in this example), is different from the current SSRC, i.e. the selected early media stream. Also, if the originating UE determines to transmit outgoing media to the target terminal 2 associated with the confirmed dialog d2, the outgoing media can be transmitted at 1170A directed to the transport address associated with the SDP body of the SIP signaling message (e.g., the SIP 200 OK (A3) message from 1120A) of d2.

Referring to FIG. 11B, 1100B through 1120B correspond to 1100A through 1120A, respectively, and as such will not be described further for the sake of brevity. At 1125B, after confirming the dialog d2 for target terminal 2, the originating UE waits a threshold period of time while continuing to play the early media from 1115B. As will be appreciated, this means that even if m1 is being played at 1115B, the originating UE will not immediately switch over to the confirmed dialog upon receipt of the SIP 200 OK (A3) message at 1120B. In an example, the threshold period of time at 1125B, or wait period, can span a duration equal to ½ of an SIP timer T 1. After waiting for the threshold period of time at 1125B, the originating UE loads codec c2 for the confirmed dialog d2 (if necessary), 1130B, and the originating UE also re-initializes the de-jitter buffer, 1135B. Also, if the originating UE determines to transmit outgoing media to the target terminal 2 associated with the confirmed dialog d2, the outgoing media can be transmitted at 1140B directed to the transport address associated with an SDP body contained in an SIP signaling message (e.g., the SIP 200 OK (A3) message from 1120B) of d2.

While the above-described embodiments include references to wireless technologies such as CDMA, etc., it will be appreciated the above-described embodiments are not limited to wireless devices, but instead can be implemented on any type of communication device including wired communication devices. Thus, even though the term user equipment or UE is sometimes associated with wireless devices, no such implication is intended to be introduced to the UEs discussed above with respect to FIGS. 5 through 11B.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of setting up a communication session based upon Session Initiation Protocol (SIP), comprising:
    sending an invite to the communication session to multiple target devices from an originating device;
    receiving a first packet of a first media stream from a first target device of the multiple target devices prior to receipt of a signaling indication that any of the multiple target devices accepts the invite;
    receiving, after the reception of the first packet of the first media stream and prior to receipt of the signaling indication, a first packet of a second media stream from a second target device of the multiple target devices;
    selecting between the first and second media streams for the communication session based at least in part upon (i) information contained in the first packet of the first media stream and the first packet of the second media stream and (ii) signaling information that indicates a forking context for the communication session and is received prior to the signaling indication that any of the multiple target devices accepts the invite;
    loading a codec associated with playback of the selected media stream; and
    playing the selected media stream prior to receipt of the signaling indication.

2. The method of claim 1, wherein the selecting step selects the first media stream.

3. The method of claim 1, wherein the selecting step selects the second media stream.

4. The method of claim 1, wherein the signaling information indicates the forking context as corresponding to a call forwarding scenario, a color ring back tone (CRBT) scenario with a given codec used by a CRBT server for an associated dialog being identified by the signaling information and/or media source identification scenario whereby the signaling information indicates a source of the first media stream and/or the second media stream.

5. The method of claim 1, wherein the signaling information is contained within an SIP message and/or a Session Description Protocol (SDP) portion of the SIP message.

6. The method of claim 1, further comprising:
    receiving the signaling indication,
    wherein the received signaling indication indicates that the first or second target device accepts the invite,
    wherein the received signaling indication confirms a dialog associated with the first or second media stream.

7. The method of claim 6, further comprising:
    selectively loading a given codec for playback of the confirmed dialog;
    determining a source identifier from the received signaling indication that is associated with the confirmed dialog;
    configuring a filter to drop incoming packets that do not match the determined source identifier.

8. The method of claim 6, further comprising:
    waiting a threshold period of time after receiving the received signaling indication while continuing to play the selected media stream; and
    after the waiting step, selectively loading a given codec for playback of the confirmed dialog.

9. The method of claim 1, further comprising:
    installing, after the first packet of the first media stream is received, a filter corresponding to a first source identifier of the first packet of the first media stream,
    wherein the selecting selects the first media stream instead of the second media stream based on the filter's correspondence to the first source identifier associated with the first media stream.

10. The method of claim 9, further comprising:
    dropping the first packet of the second media stream based on a second source identifier of the first packet of the second media stream lacking a correspondence to the filter.

11. The method of claim 9, wherein the first source identifier corresponds to a synchronization source identifier (SSRC) contained within a header of the first packet of the first media stream.

12. The method of claim 1, further comprising:
    installing, after the first packet of the first media stream is received, a filter corresponding to a first source identifier of the first packet of the first media stream; and
    updating, after the first packet of the second media stream is received, the filter to correspond to a second source identifier of the first packet of the second media stream,
    wherein the selecting selects the second media stream instead of the first media stream based on the updated filter's correspondence to the second source identifier associated with the second media stream.

13. The method of claim 12, further comprising:
    dropping at least one packet of the first media stream based on their lack of correspondence to the updated filter.

14. The method of claim 12, wherein the updating includes adding the first source identifier to a blocked source identifier list, further comprising:
    dropping at least one packet of the first media stream based on the first source identifier's presence within the blocked source identifier list.

15. The method of claim 12, wherein the first and second source identifiers corresponds to synchronization source identifiers (SSRCs) contained within headers of the first packets of the first and second media streams, respectively.

16. A communications device configured to set-up a communication session based upon Session Initiation Protocol (SIP), comprising:
    means for sending an invite to the communication session to multiple target devices from an originating device;
    means for receiving a first packet of a first media stream from a first target device of the multiple target devices prior to receipt of a signaling indication that any of the multiple target devices accepts the invite;
    means for receiving, after the reception of the first packet of the first media stream and prior to receipt of the signaling indication, a first packet of a second media stream from a second target device of the multiple target devices;
    means for selecting between the first and second media streams for the communication session based at least in part upon (i) information contained in the first packet of the first media stream and the first packet of the second media stream and (ii) signaling information that indicates a forking context for the communication session and is received prior to the signaling indication that any of the multiple target devices accepts the invite;
    means for loading a codec associated with playback of the selected media stream; and
    means for playing the selected media stream prior to receipt of the signaling indication.

17. A communications device configured to set-up a communication session based upon Session Initiation Protocol (SIP), comprising:
- logic configured to send an invite to the communication session to multiple target devices from an originating device;
- logic configured to receive a first packet of a first media stream from a first target device of the multiple target devices prior to receipt of a signaling indication that any of the multiple target devices accepts the invite;
- logic configured to receive, after the reception of the first packet of the first media stream and prior to receipt of the signaling indication, a first packet of a second media stream from a second target device of the multiple target devices;
- logic configured to select between the first and second media streams for the communication session based at least in part upon (i) information contained in the first packet of the first media stream and the first packet of the second media stream and (ii) signaling information that indicates a forking context for the communication session and is received prior to the signaling indication that any of the multiple target devices accepts the invite;
- logic configured to load a codec associated with playback of the selected media stream; and
- logic configured to play the selected media stream prior to receipt of the signaling indication.

18. A non-transitory computer-readable medium containing instructions stored thereon, which, when executed by a communications device configured to set-up a communication session based upon Session Initiation Protocol (SIP), cause the communications device to perform operations, the instructions comprising:
- at least one instruction to send an invite to the communication session to multiple target devices from an originating device;
- at least one instruction to receive a first packet of a first media stream from a first target device of the multiple target devices prior to receipt of a signaling indication that any of the multiple target devices accepts the invite;
- at least one instruction to receive, after the reception of the first packet of the first media stream and prior to receipt of the signaling indication, a first packet of a second media stream from a second target device of the multiple target devices;
- at least one instruction to select between the first and second media streams for the communication session based at least in part upon (i) information contained in the first packet of the first media stream and the first packet of the second media stream and (ii) signaling information that indicates a forking context for the communication session and is received prior to the signaling indication that any of the multiple target devices accepts the invite;
- at least one instruction to load a codec associated with playback of the selected media stream; and
- logic configured to play the selected media stream prior to receipt of the signaling indication.

\* \* \* \* \*